US012408623B2

(12) United States Patent
Jakubowski et al.

(10) Patent No.: US 12,408,623 B2
(45) Date of Patent: *Sep. 9, 2025

(54) CONVERTIBLE PET STROLLER AND CARRIER

(71) Applicant: Vermont Juvenile Furniture Mfg., Inc., West Rutland, VT (US)

(72) Inventors: Chris Jakubowski, Rutland, VT (US); Todd M. Jakubowski, Rutland, VT (US); Kristen Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,942

(22) Filed: Jan. 15, 2021

(65) Prior Publication Data

US 2021/0127627 A1    May 6, 2021

Related U.S. Application Data

(63) Continuation of application No. 16/823,544, filed on Mar. 19, 2020, now Pat. No. 12,178,187.

(60) Provisional application No. 62/820,594, filed on Mar. 19, 2019.

(51) Int. Cl.
*A01K 1/02* (2006.01)
(52) U.S. Cl.
CPC .......... *A01K 1/0272* (2013.01); *A01K 1/0245* (2013.01)

(58) Field of Classification Search
CPC ........ A47D 13/025; B62B 7/14; B62B 7/142; B62B 7/145; B62B 9/102; A01K 1/0272; A01K 1/0245
See application file for complete search history.

(56) References Cited

U.S. PATENT DOCUMENTS

| 1,623,259 | A | | 4/1927 | McGregor et al. |
| 2,365,003 | A | | 12/1944 | Reinholz |
| 3,116,069 | A | | 12/1963 | Dostal |
| 3,159,850 | A | | 12/1964 | Aldrich et al. |
| 3,349,413 | A | | 10/1967 | Merlis |
| 4,412,688 | A | * | 11/1983 | Giordani ................... B62B 7/08 280/658 |
| 4,481,685 | A | | 11/1984 | Watson |
| 4,707,024 | A | | 11/1987 | Schrader |
| D308,656 | S | * | 6/1990 | Takahashi .................... D12/129 |
| 5,074,575 | A | * | 12/1991 | Bigo ......................... B62B 7/10 280/647 |

(Continued)

FOREIGN PATENT DOCUMENTS

| CN | 201258003 | Y | * | 6/2009 | |
| CN | 100584657 | C | * | 1/2010 | ........... B60N 2/2806 |

(Continued)

OTHER PUBLICATIONS

CN-207201652-U FIT database Translation (Year: 2018).*

(Continued)

*Primary Examiner* — Katelyn T Truong
(74) *Attorney, Agent, or Firm* — Volpe Koenig

(57) ABSTRACT

An assembly comprising a pet stroller with a removably attached pet carrier. The pet carrier has front and rear access to the enclosed space and is useable separately from the stroller.

15 Claims, 20 Drawing Sheets

(56) References Cited

U.S. PATENT DOCUMENTS

| | | | |
|---|---|---|---|
| 5,201,535 A * | 4/1993 | Kato | B62B 7/123 |
| | | | 297/229 |
| 5,203,577 A * | 4/1993 | Kato | B62B 7/142 |
| | | | 280/47.38 |
| D344,701 S * | 3/1994 | Church | D12/129 |
| 5,479,892 A | 1/1996 | Edwards | |
| 5,524,965 A | 6/1996 | Barley | |
| 5,553,885 A * | 9/1996 | Chang | B62B 7/14 |
| | | | 280/658 |
| 5,772,279 A | 6/1998 | Johnson, Jr. | |
| D398,083 S | 9/1998 | Martz | |
| D432,464 S | 10/2000 | Gehr | |
| 6,139,046 A * | 10/2000 | Aalund | B62B 9/20 |
| | | | 280/47.38 |
| 6,223,691 B1 | 5/2001 | Beattie | |
| D445,966 S | 7/2001 | Licciardello | |
| 6,267,404 B1 | 7/2001 | Yang et al. | |
| D453,593 S | 2/2002 | Licciardello | |
| D455,680 S | 4/2002 | Huang | |
| 6,416,076 B1 | 7/2002 | Hou et al. | |
| D463,329 S | 9/2002 | Yang et al. | |
| D469,929 S | 2/2003 | Licciardello | |
| D475,660 S | 6/2003 | Licciardello | |
| 6,755,435 B2 * | 6/2004 | Hsia | B62B 7/083 |
| | | | 280/47.38 |
| 6,766,930 B2 | 7/2004 | Dixon et al. | |
| 6,910,709 B2 | 6/2005 | Chen | |
| D510,549 S | 10/2005 | Kassai et al. | |
| 7,011,318 B2 | 3/2006 | Chen | |
| 7,090,242 B1 | 8/2006 | Sheinall et al. | |
| D569,049 S | 5/2008 | Lin | |
| D574,757 S | 8/2008 | Chen | |
| 7,500,692 B2 | 3/2009 | Espenshade | |
| 7,568,450 B2 | 8/2009 | Chen | |
| D608,505 S | 1/2010 | Lin | |
| 7,665,421 B2 | 2/2010 | Martz | |
| 7,753,397 B2 | 7/2010 | Yang | |
| 7,862,069 B2 | 1/2011 | King | |
| D654,406 S | 2/2012 | Henry | |
| 8,186,705 B2 | 5/2012 | Greger et al. | |
| 8,360,498 B1 | 1/2013 | Ostad et al. | |
| 8,651,502 B2 * | 2/2014 | Winterhalter | B60N 2/2848 |
| | | | 280/643 |
| 8,708,364 B2 | 4/2014 | Gower et al. | |
| D707,896 S | 6/2014 | Renforth | |
| 8,955,856 B2 | 2/2015 | Guo | |
| D723,746 S | 3/2015 | Jakubowski | |
| 9,108,659 B2 * | 8/2015 | Sparling | B62B 7/142 |
| D757,370 S | 5/2016 | Jakubowski et al. | |
| D793,914 S | 8/2017 | Eriksson | |
| D801,592 S | 10/2017 | Jakubowski et al. | |
| D802,489 S | 11/2017 | Stiba | |
| D808,084 S | 1/2018 | Lu | |
| D815,567 S | 4/2018 | Oakes | |
| D827,939 S | 9/2018 | Jakubowski et al. | |
| D833,918 S | 11/2018 | Gopaul | |
| D855,899 S | 8/2019 | Jakubowski et al. | |
| D856,602 S | 8/2019 | Lu | |
| D869,099 S | 12/2019 | Lu | |
| D869,344 S | 12/2019 | Oakes | |
| D874,987 S | 2/2020 | Baker et al. | |
| D875,619 S | 2/2020 | Conley | |
| D878,249 S | 3/2020 | Pos | |
| D882,184 S | 4/2020 | Jakubowski et al. | |
| D883,860 S | 5/2020 | Barenbrug | |
| D886,535 S | 6/2020 | Zemel | |
| 10,667,489 B2 | 6/2020 | Jakubowski et al. | |
| D889,323 S | 7/2020 | Reinius et al. | |
| D891,993 S | 8/2020 | Altenhofen et al. | |
| D893,359 S | 8/2020 | Holleis et al. | |
| D897,909 S | 10/2020 | Xiang | |
| D899,006 S | 10/2020 | Chen | |
| D906,900 S | 1/2021 | Walker et al. | |
| D915,247 S | 4/2021 | Haley et al. | |
| D919,488 S | 5/2021 | Napier | |
| D920,588 S | 5/2021 | Chen | |
| D923,256 S | 6/2021 | Jakubowski | |
| D926,639 S | 8/2021 | Hauser et al. | |
| D930,262 S | 9/2021 | Chaudhry et al. | |
| D950,425 S | 5/2022 | Lin | |
| D955,060 S | 6/2022 | Wu | |
| D955,301 S | 6/2022 | Lin | |
| D958,703 S | 7/2022 | Adler | |
| D960,770 S | 8/2022 | Jakubowski | |
| D969,033 S | 11/2022 | Huntley | |
| D982,838 S | 4/2023 | Han | |
| D984,931 S | 5/2023 | Bowers | |
| D988,611 S | 6/2023 | Pang | |
| D989,663 S | 6/2023 | Van Gelderen | |
| D991,104 S | 7/2023 | Huntley | |
| D991,576 S | 7/2023 | Yu | |
| D993,542 S | 7/2023 | Pang | |
| D996,732 S | 8/2023 | Jakubowski | |
| D996,733 S | 8/2023 | Yu | |
| D997,466 S | 8/2023 | Tu | |
| D999,681 S | 9/2023 | Adler | |
| D1,000,001 S | 9/2023 | Lu | |
| 11,760,403 B2 | 9/2023 | Yoo | |
| D1,000,717 S | 10/2023 | Lu | |
| D1,002,443 S | 10/2023 | Holper | |
| D1,003,530 S | 10/2023 | Tu | |
| D1,003,531 S | 10/2023 | Tu | |
| D1,004,209 S | 11/2023 | Chen | |
| D1,007,770 S | 12/2023 | Pang | |
| D1,012,377 S | 1/2024 | Cal | |
| D1,026,741 S | 5/2024 | Jakubowski | |
| 11,993,301 B2 | 5/2024 | Cheng | |
| 11,993,302 B2 | 5/2024 | Zheng | |
| D1,032,419 S | 6/2024 | Fang | |
| D1,035,167 S | 7/2024 | Jakubowski | |
| D1,039,449 S | 8/2024 | Yi | |
| D1,039,452 S | 8/2024 | Fang | |
| 12,060,101 B2 | 8/2024 | Su | |
| D1,042,243 S | 9/2024 | Kho | |
| D1,045,239 S | 10/2024 | Jakubowski | |
| D1,045,683 S | 10/2024 | Yi | |
| D1,047,781 S | 10/2024 | Gopaul | |
| 2005/0168006 A1 | 8/2005 | Darland | |
| 2006/0169218 A1 | 8/2006 | Chang | |
| 2008/0012408 A1 | 1/2008 | Santamaria | |
| 2011/0278810 A1 | 11/2011 | Winterhalter et al. | |
| 2013/0113185 A1 * | 5/2013 | Zehfuss | B62B 7/14 |
| | | | 280/647 |
| 2014/0159358 A1 * | 6/2014 | Chen | B62B 9/12 |
| | | | 280/769 |
| 2014/0230747 A1 | 8/2014 | Jakubowski | |
| 2014/0333106 A1 | 11/2014 | Chen | |
| 2015/0076774 A1 * | 3/2015 | Sclare | B62B 7/145 |
| | | | 280/33.993 |
| 2016/0021843 A1 | 1/2016 | Jakubowski | |
| 2016/0157458 A1 | 6/2016 | Jakubowski | |
| 2016/0229439 A1 | 8/2016 | Zhong | |
| 2016/0339940 A1 | 11/2016 | Lee et al. | |
| 2018/0132446 A1 | 5/2018 | Jakubowski | |
| 2019/0002007 A1 | 1/2019 | Xiang | |
| 2019/0053462 A1 | 2/2019 | Lin | |
| 2019/0133073 A1 | 5/2019 | Lu | |
| 2020/0236895 A1 * | 7/2020 | Cheung | A01K 1/0272 |
| 2020/0247453 A1 | 8/2020 | Gibson et al. | |
| 2020/0296919 A1 | 9/2020 | Jakubowski | |
| 2020/0353967 A1 | 11/2020 | Horst et al. | |
| 2021/0022314 A1 | 1/2021 | Xiang | |
| 2021/0127627 A1 | 5/2021 | Jakubowski | |
| 2022/0297737 A1 | 9/2022 | Horst et al. | |
| 2023/0159078 A1 | 5/2023 | Zhu | |
| 2023/0397570 A1 | 12/2023 | Cheng | |
| 2023/0415807 A1 | 12/2023 | Wu | |
| 2024/0017759 A1 | 1/2024 | Sack | |
| 2024/0067251 A1 | 2/2024 | Zhu | |
| 2024/0067252 A1 | 2/2024 | Zhong | |
| 2024/0075976 A1 | 3/2024 | Jablonski | |
| 2024/0092412 A1 | 3/2024 | Zhong | |
| 2024/0246592 A1 | 7/2024 | Gower | |

(56) References Cited

U.S. PATENT DOCUMENTS

| | | |
|---|---|---|
| 2024/0246593 A1 | 7/2024 | Saucier |
| 2024/0253684 A1 | 8/2024 | Huang |
| 2024/0278820 A1 | 8/2024 | Horst |
| 2024/0326892 A1 | 10/2024 | Zehfuss |

FOREIGN PATENT DOCUMENTS

| | | | | | |
|---|---|---|---|---|---|
| CN | 102190012 | A | * | 9/2011 | |
| CN | 103407466 | A | * | 11/2013 | |
| CN | 203876796 | U | * | 10/2014 | |
| CN | 205327136 | U | * | 6/2016 | |
| CN | 105882721 | A | * | 8/2016 | |
| CN | 205632628 | U | * | 10/2016 | |
| CN | 206005460 | U | * | 3/2017 | |
| CN | 207201652 | U | * | 4/2018 | |
| CN | 208113692 | | | 11/2018 | |
| CN | 208149362 | U | * | 11/2018 | |
| CN | 109050643 | A | * | 12/2018 | B62B 7/12 |
| CN | 213168254 | U | * | 5/2021 | |
| GB | 2268220 | A | * | 1/1994 | B62B 7/14 |
| GB | 2511200 | A | * | 8/2014 | |
| JP | 2006254801 | A | * | 9/2006 | |
| JP | 3133057 | U | * | 6/2007 | |
| JP | 2007185180 | A | * | 7/2007 | |
| JP | 2009247278 | A | * | 10/2009 | |
| JP | 2013123413 | A | * | 6/2013 | |
| JP | 2015107700 | A | * | 6/2015 | |
| JP | 2018023324 | A | * | 2/2018 | |

OTHER PUBLICATIONS

JP-2018023324-A FIT database Translation (Year: 2018).*
JP-2015107700-A FIT database Translation (Year: 2015).*
JP-2013123413-A FIT database Translation (Year: 2013).*
JP-2009247278-A FIT Database Translation (Year: 2009).*
JP-2007185180-A FIT Database Translation (Year: 2007).*
JP-3133057-U FIT Database Translation (Year: 2007).*
JP-2006254801-A FIT Database Translation (Year: 2006).*
CN208149362U and Translation (Year: 2017).*
GB-2268220-A Translation (Year: 1994).*
CN-109050643-A Translation (Year: 2018).*
CN-100584657-C Translation (Year: 2010).*
CN-201258003-Y Translation (Year: 2009).*
CN-213168254-U Translation (Year: 2021).*
Utopian pet four wheel pet stroller, https://lots-of-pets.myshopify.com/products/utopian-pet-four-wheel-pet-stroller-color-olive.
IBIYAYA elegant retro I, https://www.amazon.com/ibiyaya-FS1202-NB-Elegant-Retro-Stroller/dp/B00M1OAUEE.
Paws & Pals 4 Wheel 2-in-1 Stroller & Carrier, https://www.chewy.com/paws-pals-2-in-1-detachable-dog-cat/dp/217526.
Aosom Elite-Jr Dog Pet Bike Trailer / Stroller with Swivel Wheel—Red / Black, https://www.aosom.com/item/aosom-elite-jr-dog-pet-bike-trailer-stroller-w-swivel-wheel-red-black~5663-1334R-B.html.
HPZ PetRover USA, 3-in-1 Pet Travel System, New 2019 Model, 6 pgs.

* cited by examiner

CONVERTIBLE PET STROLLER AND CARRIER

CROSS REFERENCE TO RELATED APPLICATIONS

This application is a continuation of U.S. patent application Ser. No. 16/823,544, filed Mar. 19, 2020, which claims the benefit of U.S. Patent Application No. 62/820,594, filed Mar. 19, 2019, which are incorporated by reference as if fully set forth.

FIELD

The disclosure relates to pet carriers, car seat frames, pet strollers, and assemblies of pet carriers with car seat frames or pet strollers.

BACKGROUND

Many people enjoy taking their pets with them to a variety of locations. Often the pet may be carried. In such a case, a pet carrier may be useful. Devices to carry pets and transport pets within carriers are desired.

SUMMARY

In an aspect, the invention relates to a pet carrier comprising a top section, a bottom section having an upper rim, a handle, a first pet carrier engagement, a second pet carrier engagement, and an interior defined between the top section and the bottom section. The top section comprises a front, a back, a canopy, at least one canopy frame element supporting the canopy, a front canopy latch element at the front, and a back canopy latch element at the back. The canopy comprising a lower edge configured to be proximal to the upper rim of the bottom section. A first canopy frame element of the at least one canopy frame element extends at least partially around the lower edge of the canopy and has a front section at the front and a back section at the back. The front section and the back section meet at a first pivot on a first side of the canopy and meet at a second pivot on a second side of the canopy. The front canopy latch element is fixed to the front section and the back canopy latch element is fixed to the back section. The bottom section comprises a base, a front, a back, a first side, a second side, a shell, a bottom frame element, a front bottom latch element on the front, and a back bottom latch element on the back. The shell extends up from the base to the bottom frame element. The bottom frame element extends around the upper rim of the bottom, and the front and the back bottom latch elements are fixed to the bottom frame element. The handle comprises a first handle receiver engaged with one or more of the first canopy frame element and the first bottom frame element on a first side of the pet carrier. The handle also comprises a second handle receiver engaged with one or more of the first canopy frame element and the first bottom frame element on a second side of the pet carrier. The handle also comprises a handle bar extending from the first handle receiver to the second handle receiver and over the canopy, The front canopy latch element is engageable with the front bottom latch element to secure the front of the top to the front of the bottom in a front closed position, and is releasable to an open position, allowing movement of the top section at the front of the pet carrier to reveal the interior of the pet carrier. The back canopy latch element is engageable with the back bottom latch element to secure the back of the top to the back of the bottom in a back closed position, and is releasable to an open position, allowing movement of the top section at the back of the pet carrier to reveal the interior of the pet carrier. The first pet carrier engagement is on the first side of the bottom section. The second pet carrier engagement is on the second side of the bottom section. Both the first pet carrier engagement and the second pet carrier engagement are engageable with a secondary device in order to fix the pet carrier to the secondary device. The top section, the bottom section, and the base form an enclosure, in which a pet may be contained, within the interior of the pet carrier when the front and the back of the canopy are in the closed position.

In an aspect, the invention relates to a car seat frame. The car set frame comprises a first side, a second side, a first base element having a first end and a second end, and a second base element having a first end and a second end. The first side comprises a first side carrier support, a first vertical support on the first side, and a second vertical support on the first side. Each vertical support on the first side having a first end and a second end, the first end of each fixed to opposite ends of the first side carrier support. The second side comprising a second side carrier support, a first vertical support on the second side, and a second vertical support on the second side. Each vertical support on the second side having a first end and a second end, the first end of each fixed to opposite ends of the second side carrier support. The second end of the first vertical support on the first side is fixed to the first end of the first base element. The second end of the second vertical support on the first side is fixed to the first end of the second base element. The second end of the first vertical support on the second side is fixed to the second end of the first base element. The second end of the second vertical support on the second side is fixed to the second end of the second based element. The car seat frame further comprises a first frame-carrier receiver fixed to the first side carrier support and a second car seat frame-carrier receiver fixed to the second side carrier support.

In an aspect, the invention relates to an assembly comprising a pet carrier and the car seat frame as summarized above.

In an aspect the invention relates to a pet stroller comprising a frame and wheels. The frame comprises a first side, a second side, a push bar, a carrier support. Each side comprises a front lower portion, a rear lower portion, a mid portion, and an upper portion. Each of the front and rear lower portions having first end and a wheel engagement at the first end to which one of the wheels is engaged. The front and rear lower portions on the first side each have a second end opposite the respective first ends that converge at a first junction. The front and rear lower portions on the second side each have a second end opposite the respective first end that converges at a second junction. The mid portion on the first side has a first end at the first junction and a second end extended in a direction generally opposite to the direction in which the lower portion on the first side extends from the first junction. The mid portion on the second side has a first end at the second junction and a second end extending in a direction generally opposite to the direction in which the lower portion on the second side extends from the second junction. The upper portion on the first side has a first end extending from the second end of the mid portion on the first side and a second end. The upper portion on the second side has a first end extending from the second end of the mid portion on the second side and a second end. The push bar having a first end connected to the second end of the upper portion on the first side, and a second end connected to the second end of the upper portion on the second side. The carrier support is configured to receive a pet carrier.

In an aspect, the invention relates to an assembly comprising a pet carrier and the pet stroller summarized above.

In an aspect, the invention relates to a system comprising at least two of the above summarized pet carrier, car seat frame, and pet stroller.

In an aspect, the invention relates to a pet carrier. The pet carrier comprises a top section, a bottom section having an upper rim, a handle, a first pet carrier engagement, a second pet carrier engagement, and an interior defined between the top section and the bottom section. The top section comprises a front, a back, a canopy, at least one canopy frame element supporting the canopy, a front canopy latch element at the front, and a back canopy latch element at the back. The canopy comprises a lower edge configured to be proximal to the upper rim of the bottom section, a first canopy frame element of the at least one canopy frame element extending at least partially around the lower edge of the canopy and having a front section at the front and a back section at the back. The front section and the back section meet at a first pivot on a first side of the canopy. The front section and the back section also meet at a second pivot on a second side of the canopy. The front canopy latch element is fixed to the front section, and the back canopy latch element is fixed to the back section. The bottom section comprises a base, a front, a back, a first side, a second side, a shell, a bottom frame element, a front bottom latch element on the front, and a back bottom latch element on the back. The shell extends up from the base to the bottom frame element. The bottom frame element extends around the upper rim of the bottom. The front and the back bottom latch elements are fixed to the bottom frame element. The handle comprising a first handle receiver engaged with one or more of the first canopy frame element and the first bottom frame element on a first side of the pet carrier, and a second handle receiver engaged with one or more of the first canopy frame element and the first bottom frame element on a second side of the pet carrier. The handle also comprises a handle bar extending from the first handle receiver to the second handle receiver and over the canopy. The front canopy latch element being engageable with the front bottom latch element to secure the front of the top to the front of the bottom in a front closed position. The front canopy latch element also being releasable to an open position, allowing movement of the top section at the front of the pet carrier to reveal the interior of the pet carrier. The back canopy latch element being engageable with the back bottom latch element to secure the back of the top to the back of the bottom in a back closed position. The back canopy latch element also being releasable to an open position, allowing movement of the top section at the back of the pet carrier to reveal the interior of the pet carrier. The first pet carrier engagement on the first side of the bottom section. The second pet carrier engagement on the second side of the bottom section. Both the first pet carrier engagement and the second pet carrier engagement being engageable with respective receivers on a secondary device in order to fix the pet carrier to the secondary device. The top section, the bottom section, and the base forming an enclosure, in which a pet may be contained, within the interior of the pet carrier when the front and the back of the canopy are in the closed position.

In another aspect, the invention relates to a car seat frame. The car seat frame comprises a first side, a second side, a first base element having a first end and a second end, and a second base element having a first end and a second end. The first side comprises a first side carrier support, a first vertical support on the first side, and a second vertical support on the first side. Each vertical support on the first side has a first end and a second end, the first end of each fixed to opposite ends of the first side carrier support. The second side comprises a second side carrier support, a first vertical support on the second side, and a second vertical support on the second side. Each vertical support on the second side having a first end and a second end, the first end of each fixed to opposite ends of the second side carrier support. The second end of the first vertical support on the first side is fixed to the first end of the first base element. The second end of the second vertical support on the first side is fixed to the first end of the second base element. The second end of the first vertical support on the second side is fixed to the second end of the first base element, and the second end of the second vertical support on the second side is fixed to the second end of the second based element. The car seat frame further comprises a first frame-carrier receiver fixed to the first side carrier support and a second car seat frame-carrier receiver fixed to the second side carrier support. The car seat frame may comprise one or more seat belt retainers, where each seat belt retainer is fixed to one of the vertical supports. The one or more seat belt retainers may comprise a first seat belt retainer fixed to the first vertical support on the first side, and a second seat belt retainer fixed to the second vertical support on the first side. The car seat frame may comprise a first frame-carrier receiver fixed to the first side carrier support and a second frame-carrier receiver fixed to the second side carrier support.

In another aspect, the invention relates to an assembly comprising a pet carrier and the car seat frame. The pet carrier may be the pet carrier summarized above. When the pet carrier is the pet carrier summarized above, the first pet carrier engagement may be engaged with the first frame-carrier receiver, and the second pet carrier engagement may be engaged with the second frame-carrier receiver.

In an aspect, the invention relates to a pet stroller comprising a frame and four wheels. The frame comprises a first side, a second side, a push bar, a pet carrier support. Each side comprises a front lower portion, a rear lower portion, a mid portion, and an upper portion. Each of the front and rear lower portions having a first end and a wheel engagement at the first end to which one of the wheels is engaged. The front and rear lower portions on the first side each have a second end opposite the respective first ends that converge at a first junction. The front and rear lower portions on the second side each have a second end opposite the respective first end that converge at a second junction. The mid portion on the first side has a first end at the first junction and a second end extended in a direction generally opposite to the direction in which the lower portion on the first side extends from the first junction. The mid portion on the second side has a first end at the second junction and a second end extending in a direction generally opposite to the direction in which the lower portion on the second side extends from the second junction. The upper portion on the first side has a first end extending from the second end of the mid portion on the first side and a second end. The upper portion on the second side has a first end extending from the second end of the mid portion on the second side and a second end. The push bar has a first end connected to the second end of the upper portion on the first side, and the second end connected to the second end of the upper portion on the second side.

In another aspect, the invention relates to an assembly comprising a pet carrier and the pet stroller summarized above. The pet carrier may rest upon the front and rear carrier supports. The pet carrier may be the pet carrier summarized above. When the pet carrier is the pet carrier summarized above, the first and second pet carrier engagements may be respectively engaged with the first and second pet carrier receivers.

In an aspect, the invention relates to a system comprising at least two of the above summarized aspects.

BRIEF DESCRIPTION OF THE DRAWINGS

The following detailed description of embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION

Figure 1:
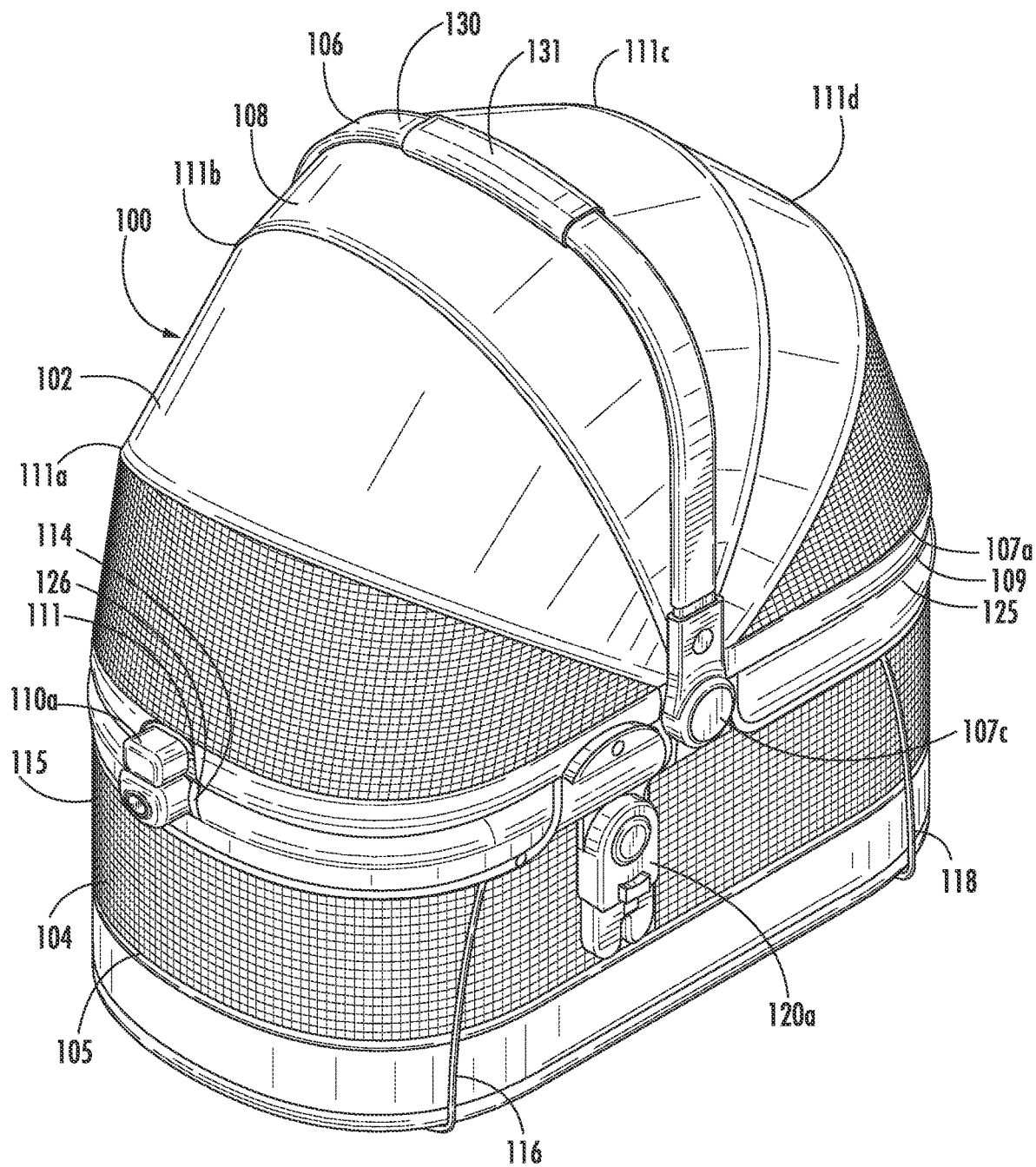
FIG. 1 illustrates a perspective view of a pet carrier.
Figure 2:
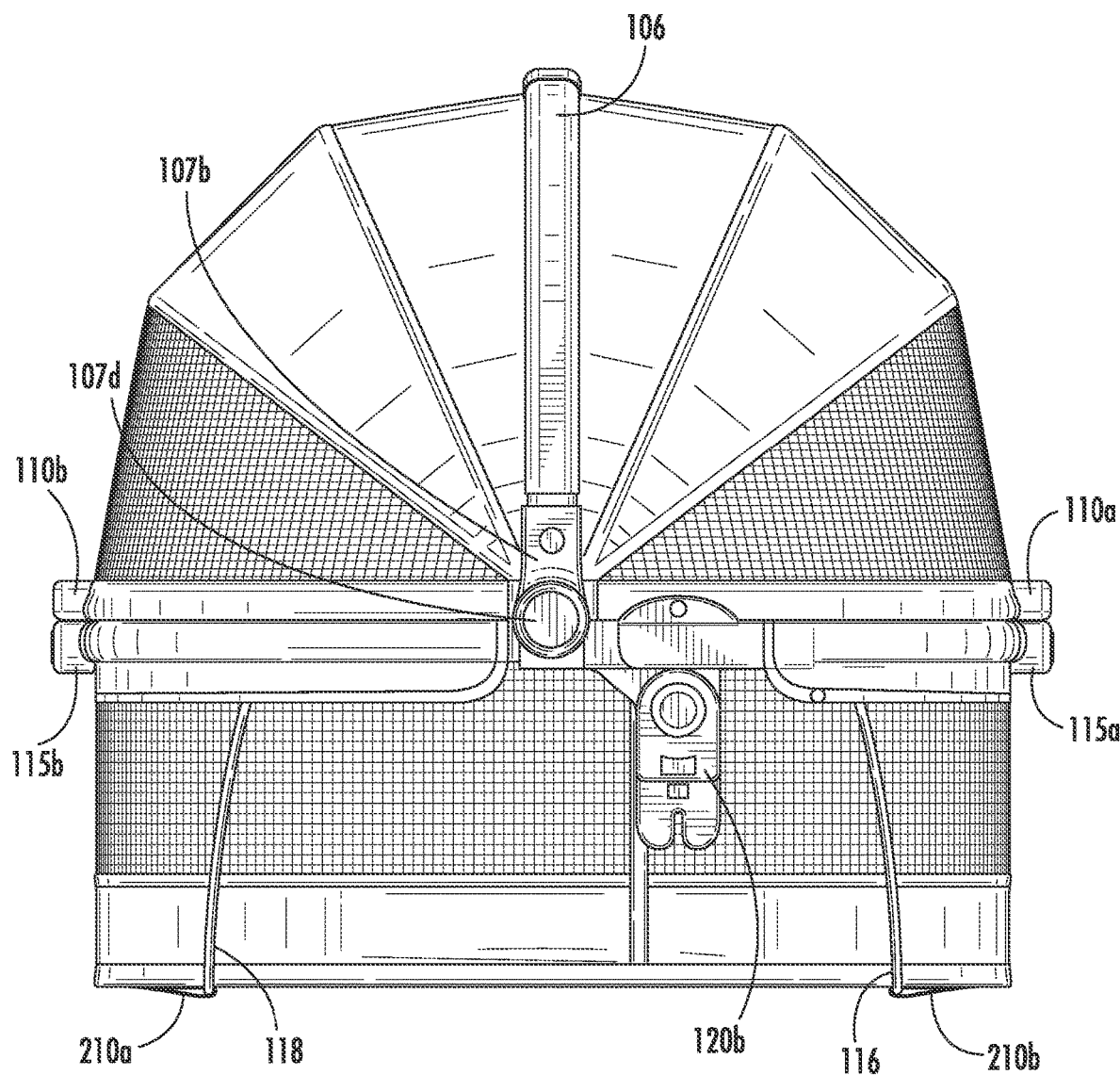
FIG. 2 illustrates a first side view of the pet carrier.
Figure 3:
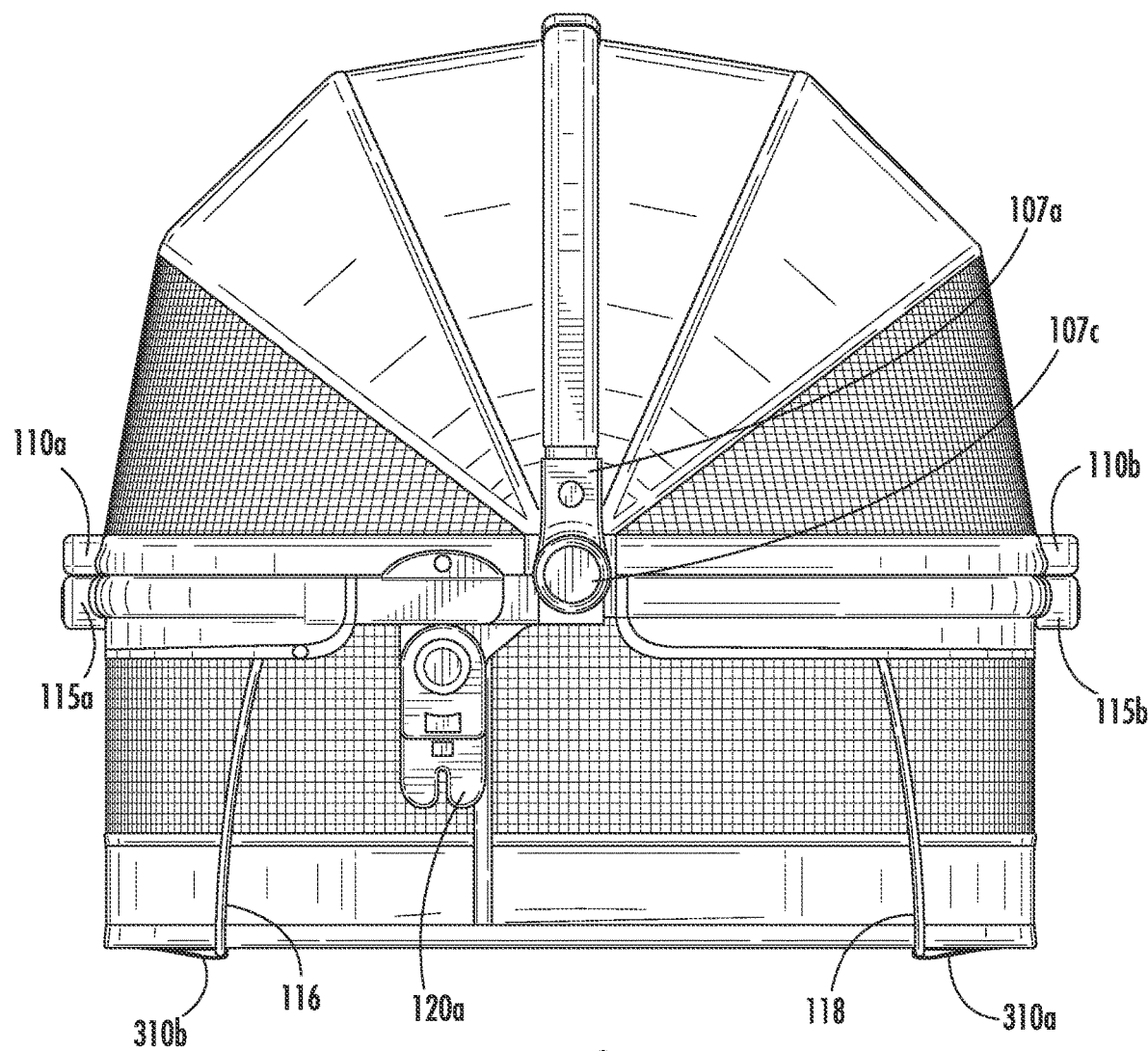
FIG. 3 illustrates a second side view of the pet carrier.
Figure 4:
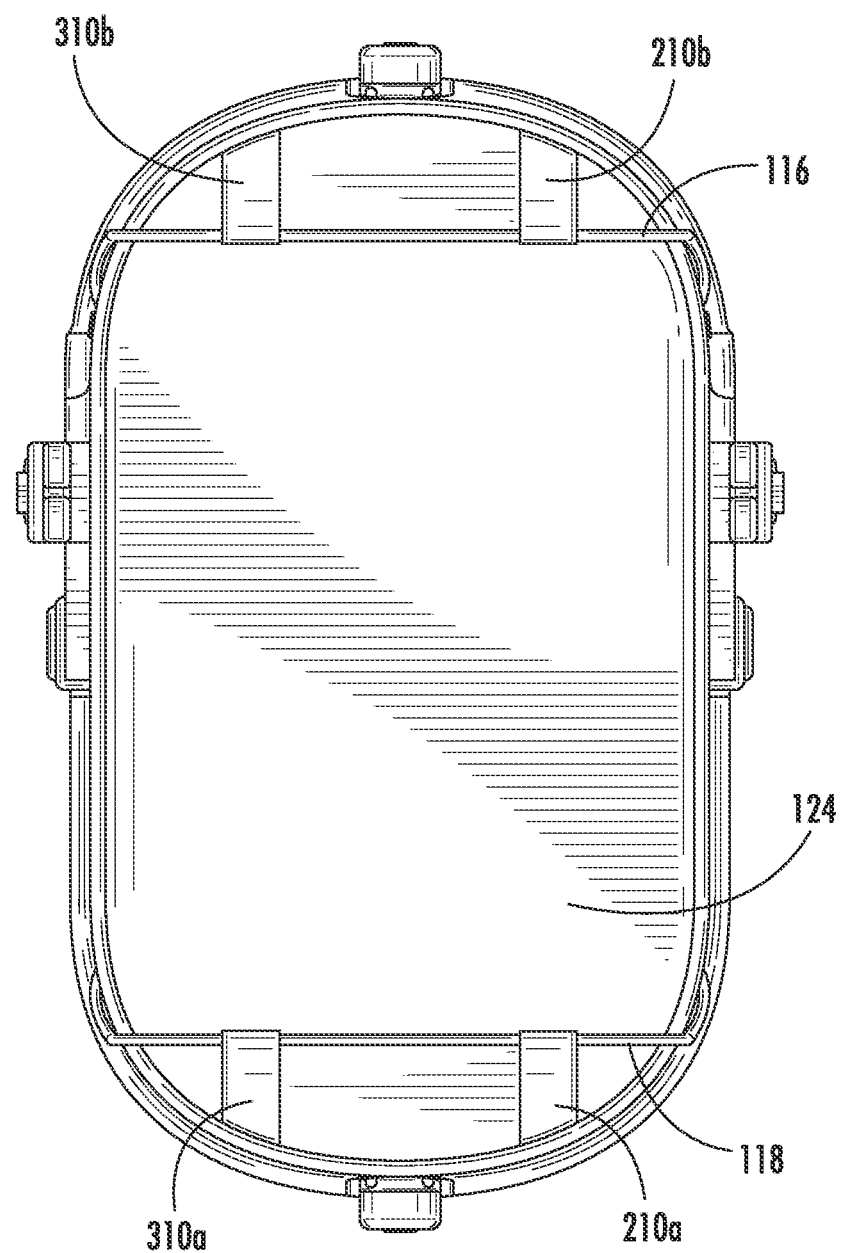
FIG. 4 illustrates a bottom view of the pet carrier.

Certain terminology is used in the following description for convenience only and is not limiting. The words "right," "left," "top," and "bottom" designate directions in the drawings to which reference is made.

The words "a" and "one," as used in the claims and in the corresponding portions of the specification, are defined as including one or more of the referenced item unless specifically stated otherwise. The phrase "at least one" followed by a list of two or more items, such as "A, B, or C," means any individual one of A, B or C as well as any combination thereof.

An embodiment includes a pet carrier. Referring to FIGS. 1-4, an embodiment is illustrated as pet carrier 100, which may comprise a top section 102, a bottom section 104 having an upper rim 125, a handle 106, a first pet carrier engagement 120a, a second pet carrier engagement 120b, and an interior defined between the top section and the bottom section.

The top section 102 may comprise a front, a back, and a canopy 108. The top section 102 may also comprise at least one canopy frame element supporting the canopy, a front canopy latch element 110a at the front, and a back canopy latch element 110b at the back, as illustrated for top section 102. Ridges 111a, 111b, 111c, and 111d may be present, and may be seams of different panels of the canopy, and/or engagement areas between the canopy at frame elements inside the canopy. Frame elements inside the canopy 108 may be enclosed within or tethered to canopy material. The canopy 108 may also comprise a lower edge 109 configured to be proximal to the upper rim 125 of the bottom section 104. A first canopy frame element 111 of the at least one canopy frame element having a front section 126 and a back section 127 may extend at least partially around the lower edge of the canopy. The front section 126 and the back section 127 may meet at a first pivot 128 on a first side of the canopy. The front section 126 and the back section 127 may also meet at a second pivot 129 on a second side of the canopy. The front section 126, back section 127, first pivot 128, and second pivot configured such that one or both of the front and back sides of the canopy may be rotated upward or downward. The front canopy latch element 110a may be attached to the front section 126 of the first canopy frame element 111, and the back canopy latch element 110b may be fixed to the back section 127 of the first canopy frame element 111. The frame elements other than the first canopy frame element 111 may each comprise a first end associated with an attachment point on the first side of the pet carrier, and a second end associated with an attachment point on the second side of the pet carrier. The attachment points may be at the first pivot 128 and the second pivot 129 such that the one or both of the front and back sides of the canopy may be rotated upward or downward. Intermediate portions, between the first and second ends, of these frame elements may be configured to contact, be contained within the material of, or be tethered to the canopy 108.

The pet carrier 100 has the bottom section 104, which may comprise a base 124, a front, a back, a first side, a second side, a shell 105, at least one bottom frame element, a front bottom latch element 115a on the front, and a back bottom latch element 115b on the back. A first bottom frame element 114 of the at least one bottom frame element may extend around the upper rim 125 of the bottom section 104. The front and the back bottom latch elements (115a, 115b) may be fixed to the first bottom frame element 114.

The material of a portion or the whole of at least one of the canopy or the shell may be opaque, translucent, solid, mesh. Any type of material may be used. The material may be nylon.

A pet carrier may include a handle, which may be the handle 106 illustrated. The handle 106 may comprise a handle bar 130, a first handle receiver 107a, and a second handle receiver 107b. The first handle receiver 107a may be engaged with at least one of the first canopy frame element 111 or the first bottom frame element 114 on the first side of the pet carrier. The second handle receiver 107b may be engaged with at least one of the first canopy frame element 111 or the first bottom frame element 115b on the second side of the pet carrier. The handle bar 130 may extend from the first handle receiver 107a to the second handle receiver 107b and over the canopy 108. Each handle receiver may be separate from the handle bar 130 and affixed to it, or integral with the handle bar 130. Each handle receiver may also be affixed to at least one of the first canopy frame element 111 or the first bottom frame element 114 or integral thereto. In an embodiment, the handle 106 is fixed in position. In an embodiment, each handle receiver may comprise a handle release (107c, 107d), which when activated allow rotation of the handle bar 130 over the top of the pet carrier 100.

The handle 106 may be comprised of more than one part or be a single piece. The pet carrier may have a grip 131, that is either a separate piece affixed to the handle bar 130 or integral with the handle bar 130.

The front canopy latch element 110a may be engageable with the front bottom latch element 115a to secure the front of the top section 102 to the front of the bottom section 104 in a front closed position. The front canopy latch element 110a may also be releasable to an open position, allowing movement of the top section 102 at the front of the pet carrier to reveal the interior of the pet carrier.

The back canopy latch element 110b may be engageable with the back bottom latch element 115b to secure the back of the top section 102 to the back of the bottom section 104 in a back closed position. The back canopy latch element 110b may be capable of being released to an open position, allowing movement of the top section 102 at the back of the canopy to reveal the interior of the pet carrier.

The first pet carrier engagement 120a is illustrated on the first side of the bottom section 104, and extending toward the base 124. The second pet carrier engagement 120b is illustrated on the second side of the bottom section 104, and extending toward the bas 124. Both the first pet carrier engagement 120a and the second pet carrier engagement 120b may be capable of engaging respective receivers on a secondary device in order to fix the pet carrier to the secondary device. The secondary device may be a car seat frame or a pet stroller. The carrier engagements 120a, 120b may be affixed to or integral with the first bottom frame element 114, or other structures on the pet carrier. In an embodiment, the carrier engagements 120a, 120b are at alternate locations on the pet carrier to fit to a specific secondary device. In an embodiment, the carrier engagements 120a, 120b may have alternate structures/mechanisms and/or be moved forward or backward along the pet carrier to so that the pet carrier may be fit to various secondary devices.

The top section 102 and the bottom section 104 may form an enclosure, in which a pet may be contained, within the interior of the pet carrier when the front and the back of the canopy are in the closed position. A pet may also be resident within the bottom section 104 while at least one or both of the front and back portions of the top section 102 are raised. The pet may then be able to view the surrounding environment, or others may be able to interact with the pet visually or by touch.

The pet carrier illustrated further comprises a first support wire 116 proximal to the front of the bottom section 104. The first support wire may be engaged with the first bottom frame element 114 on the first and second sides of the bottom section 104, and is illustrated extending from the first bottom frame element 114 along the first side of the bottom section 104 toward the base 124, across the base 124, and along the second side of the bottom section 104 toward the first bottom frame element 114. The pet carrier illustrated also further comprises a second support wire 118 proximal to the rear of the bottom section 104, engaged with the first bottom frame element 114 on the first and second sides of the bottom section 104, and is illustrated extending from the first bottom frame element 114 along the first side of the bottom section 104 toward the base 124, across the base 124, and along the second side of the bottom section 104 toward the first bottom frame element 114. The embodiment illustrated shows the support wires exterior to the shell 105. One or both of the first support wire 116 and second support wire 118 may be positioned exterior to the bottom section 104, interior to the bottom section 104, or within the material of the bottom section 104. The support wires 116, 118 may stabilize the structure of the pet carrier 100. The support wires 116, 118 may be utilized to stabilize the bottom when the pet carrier 100 is set on a surface. The embodiment illustrated includes wire holders 210a, 210b, 310a, and 310b that secure the support wires to the base 124, and may stabilize the positioning of the support wires. Embodiments of pet carriers herein may include alternate support structures to stabilize the pet carrier.

Figure 5:
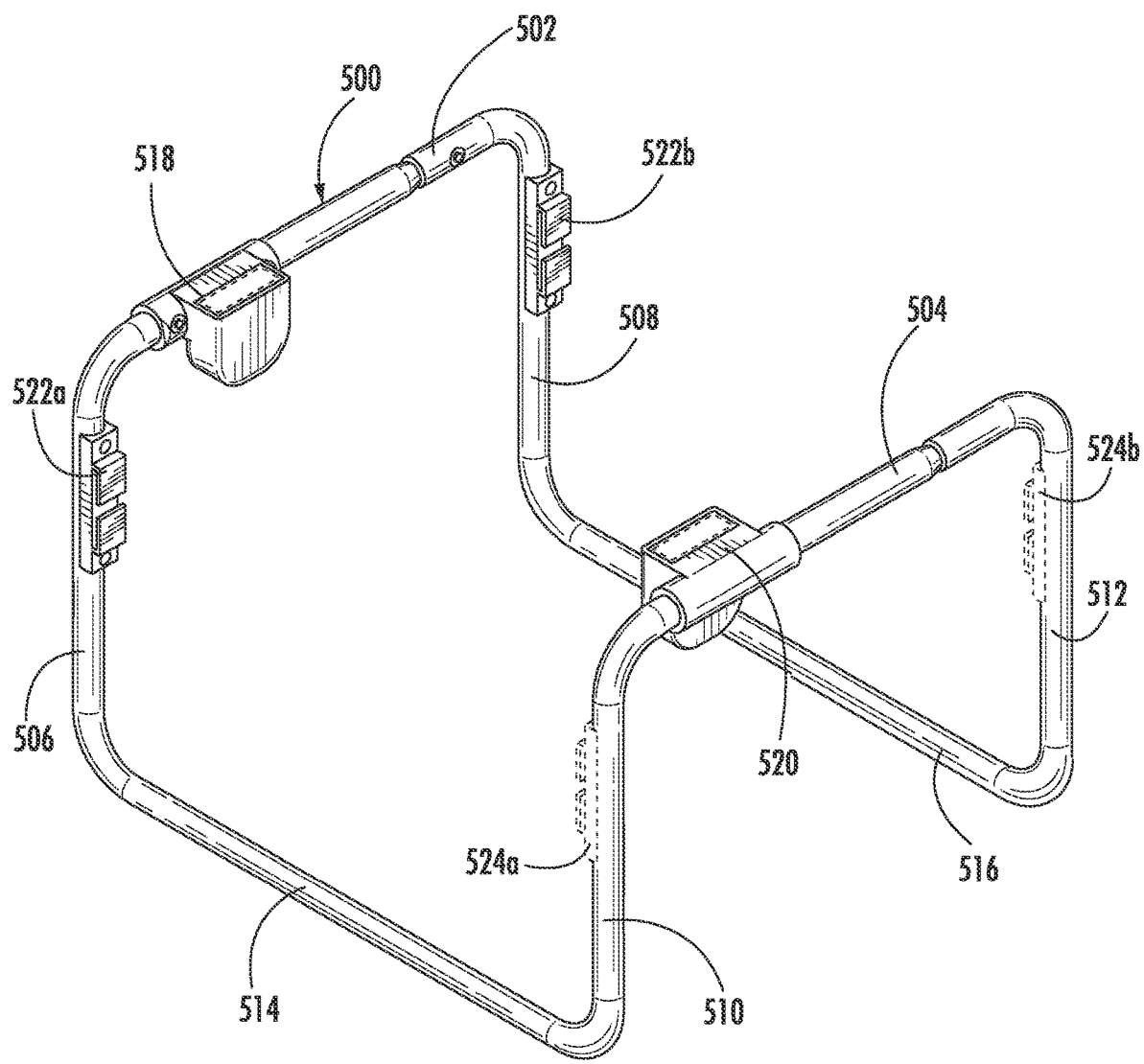
FIG. 5 illustrates a car seat frame.

An embodiment includes a car seat frame. Referring to FIG. 5, an embodiment is illustrated as car seat frame 500, which may comprise a first side, a second side, a first base element 514 having a first end and a second end, and a second base element 516 having a first end and a second end.

The first side may comprise a first side carrier support 502, a first vertical support on the first side 506, and a second vertical support on the first side 508. Each of vertical supports 506, 508 have a first end and a second end, and the first end of each is fixed to opposite ends of the first side carrier support 502.

The second side may comprise a second side carrier support 504, a first vertical support on the second side 510, and a second vertical support on the second side 512. Each of vertical supports 510, 512 have a first end and a second end, the first end of each fixed to opposite ends of the second side carrier support 504.

As illustrated, the second end of the first vertical support on the first side 506 is fixed to the first end of the first base element 514, and the second end of the second vertical support on the first side 508 is fixed to the first end of the second base element 516. The second end of the first vertical support on the second side 510 is fixed to the second end of the first base element 514, and the second end of the second vertical support on the second side 512 is fixed to the second end of the second based element 516.

FIG. 5 illustrates an embodiment of the car seat frame 500 where the first vertical supports 506, 510 on the first and second sides are integral with the first base element 514, and the first vertical supports 506, 510 are integral with a portion of the first side carrier support 502 and second side carrier support 504, respectively. This portion of the car seat frame may be referred to as a first piece. The first side carrier support 502 and second side carrier support 504 each include a junction where a non-integral second piece is fixed and extends to the second end of each of the first side carrier support 502 and second side carrier support 504. The first piece ends at the junction, and the remaining portion of first side carrier support 502 and second side carrier support 504 in combination with the second vertical supports 508, 512 and second base element 516 may be referred to as the second piece of the car seat frame 500. These elements may be constructed as illustrated, or by any other arrangement. They may all be integral with one another, or divided into two or separate pieces that are fixed together by any suitable fastener or junction element. The material of these elements may be any material sufficient to create the structure, and withstand the anticipated weight of a pet carrier and pet set on the car seat frame. For example, the material may be metal or polymeric. The material may be hollow or solid. The material may be hollow tubing.

A car seat frame may comprise one or more seat belt retainers. Seat belt retainers 522a and 522b are illustrated in FIG. 5 and may be used to secure the car seat frame 500 on a car seat with the seat belt fitted with the retainers. Seat belt retainers 524a, 524b are optional for the FIG. 5 embodiment, and if present would allow securing the car seat frame 500 to the seat in the opposite direction. Seat belt retainers may be integral with or separate from the vertical supports.

A car set may be secured to a car seat frame in embodiments herein in many different fashions. For example, a car seat could be strapped to a car seat frame. The car seat frame 500 comprises a first frame-carrier receiver 518 fixed to the first side carrier support 502 and a second frame-carrier receiver 520 fixed to the second side carrier support 504. The frame-carrier receivers may engage matching engagements of a carrier. For example, the frame-carrier receiver 518 and frame-carrier receiver 520 may engage pet carrier engagement 120a and pet carrier engagement 120b of pet carrier 100 (see FIGS. 1-4).

Figure 9:
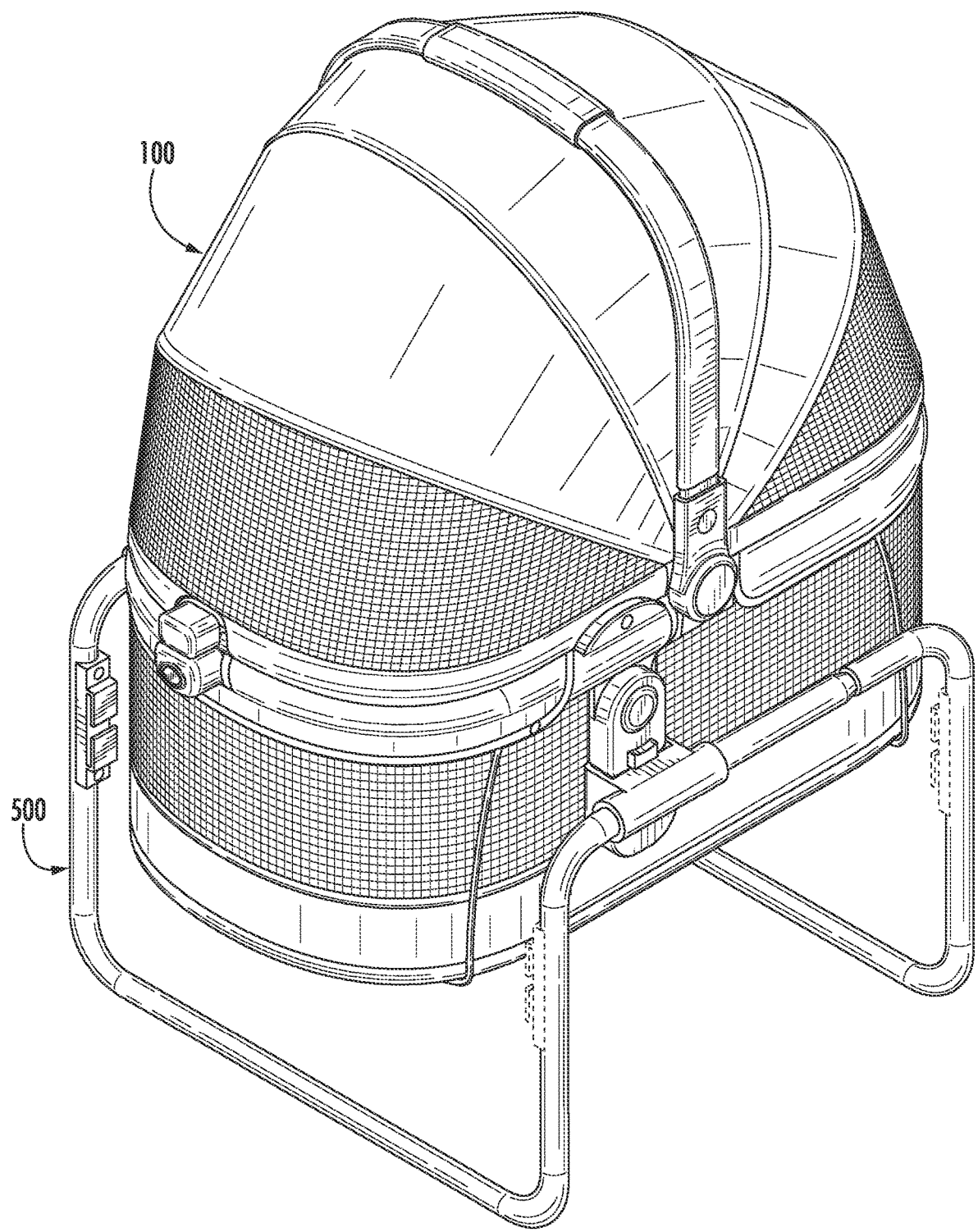
FIG. 9 illustrates an assembly of a pet carrier and a car seat frame.

An embodiment includes an assembly comprising a pet carrier and a car seat frame, where the pet carrier is secured to the car seat frame. Optionally, the car seat frame is also secured to a seat. The seat may be the seat of a car. The car seat frame could be secured to the seat of the car by wrapping a seat belt of the seat around elements of the frame. An embodiment of the assembly includes the pet carrier 100 secured to the car seat frame 500, as illustrated in FIG. 9. As illustrated in FIG. 9, the frame-carrier receiver 518 and frame-carrier receiver 520 engage pet carrier engagement 120a and pet carrier engagement 120b of pet carrier 100. The assembly of pet carrier 100 and car seat frame 500 may further comprise a seat comprising a seat belt, where the seat belt is arranged in the seat belt retainer 522a and seat belt retainer 522b, or the optional seat belt retainer 524a and seat belt retainer 524b, to secure the car seat frame 500 to the seat. The seat may be a car seat.

Figure 6:
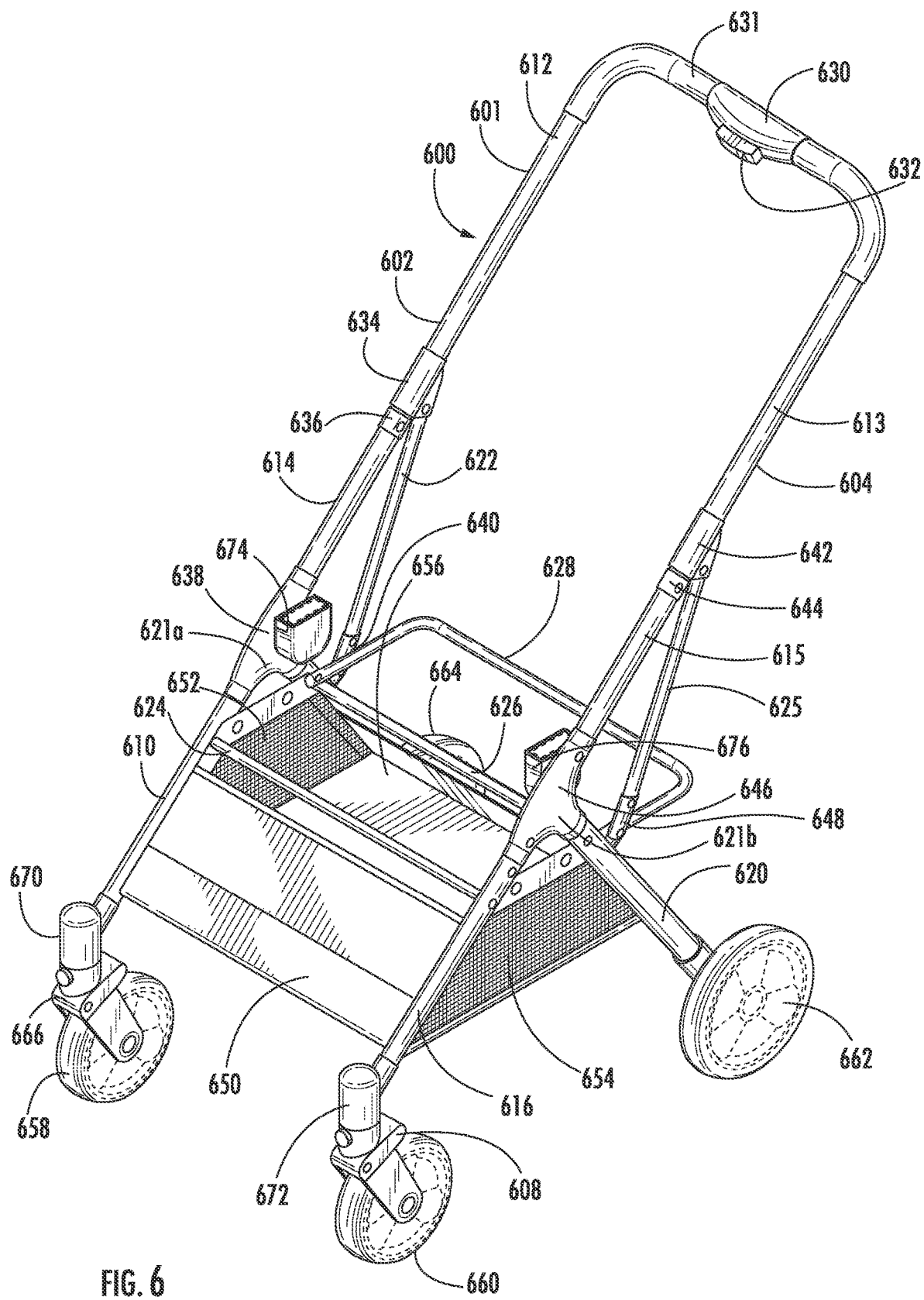
FIG. 6 illustrates a pet stroller.
Figure 7:
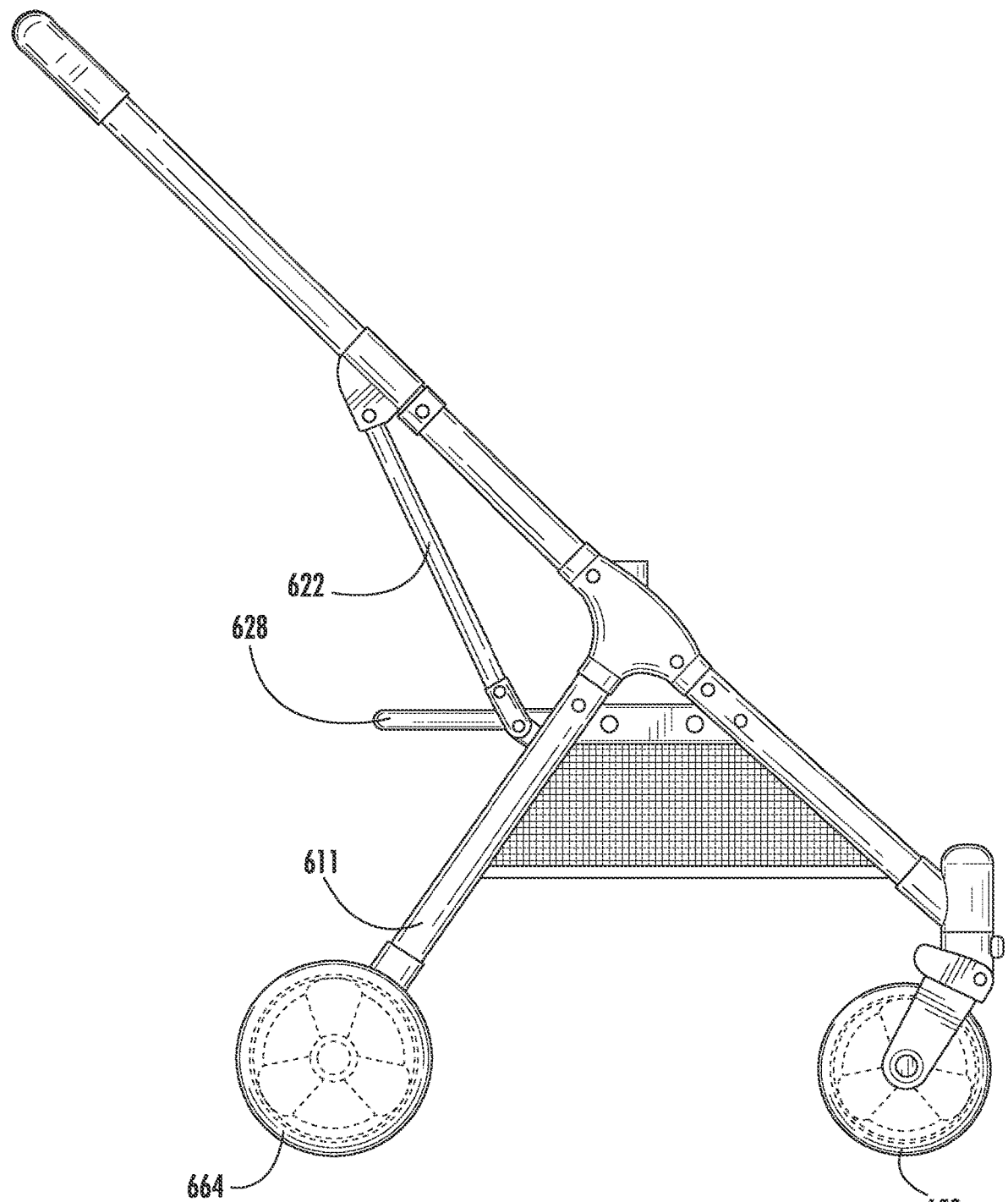
FIG. 7 illustrates a side view of the pet stroller.
Figure 8:
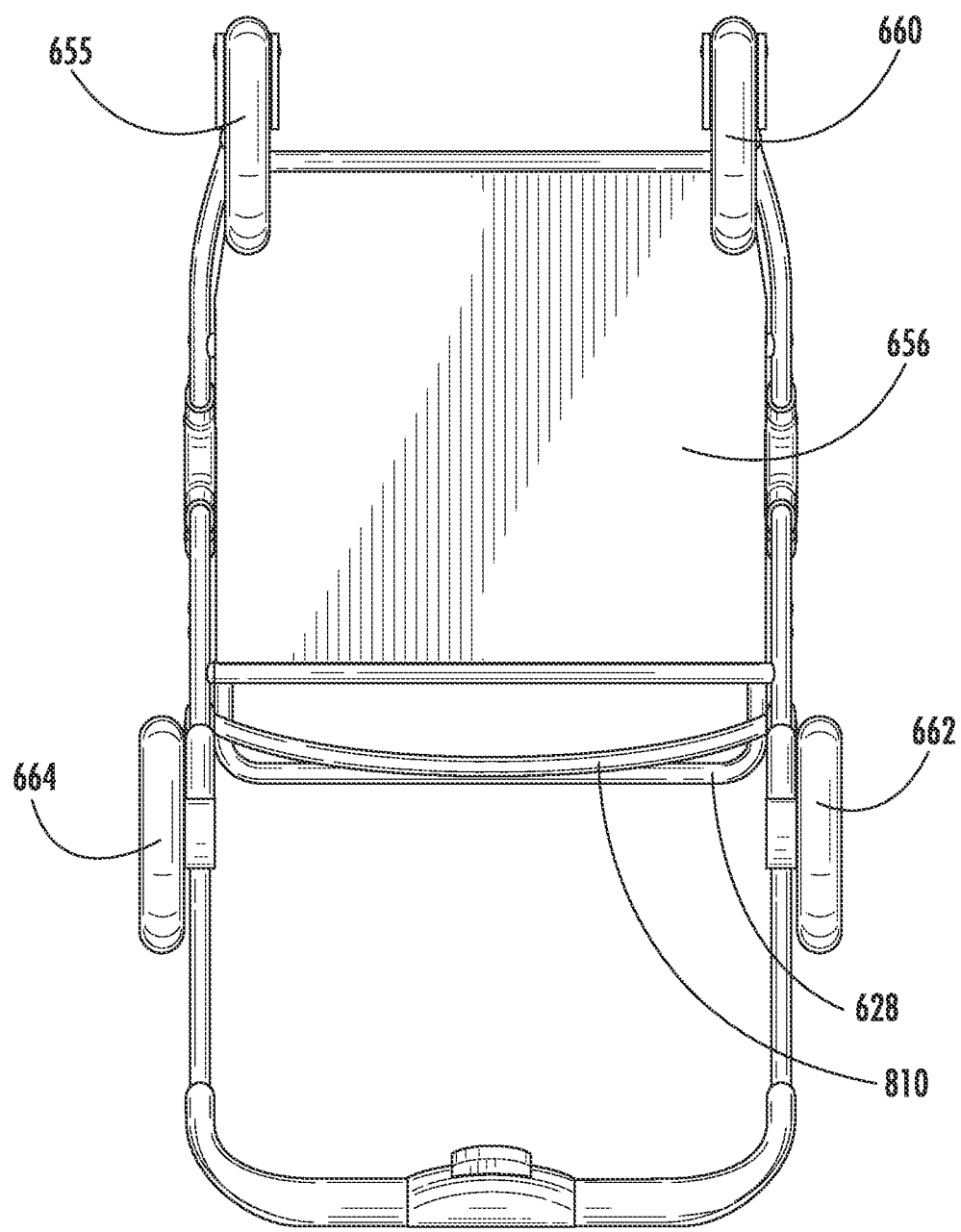
FIG. 8 illustrates a bottom view of the pet stroller.

An embodiment includes a pet stroller that may carry a pet carrier. The pet stroller may include wheels in any configuration and supports on which a pet carrier may rest. It may also include restraints to secure the pet carrier to the pet stroller. Referring to FIGS. 6-8, an embodiment is illustrated as pet stroller 600, which comprises a frame 601 and four wheels (wheel 658, wheel 660, wheel 662, and wheel 664).

As illustrated, the frame comprises a first side 602, a second side 604, a push bar 631, a front pet carrier support 624, and a rear pet carrier support 628. Each of the first side 602 and the second side 604 comprises a front lower portion (610, 616), a rear lower portion (611, 620), a mid-portion (614, 615), and an upper portion (612, 613). Each of the front and rear lower portions have a first end and a wheel engagement at the first end to which one of the wheels is engaged. The front 610 and rear 611 lower portions on the first side each having a second end opposite the respective first ends that converge at a first junction 621a. The front 616 and rear 620 lower portions on the second side each have a second end opposite the respective first end that converges at a second junction 621b. The mid portion 614 on the first side has a first end at the first junction 621a and a second end extended in a direction generally opposite to the direction in which the lower portion on the first side extends from the first junction. The mid portion 615 on the second side has a first end at the second junction 621b and a second end extending in a direction generally opposite to the direction in which the lower portion on the second side extends from the second junction. The upper portion 612 on the first side is illustrated with a first end extending from the second end of the mid portion 614 on the first side and a second end, the upper portion 613 on the second side having a first end extending from the second end of the mid portion 615 on the second side and a second end. The push bar 631 is illustrated with a first end connected to the second end of the upper portion 612 on the first side, and a second end connected to the second end of the upper portion 613 on the second side. The specific arrangement illustrated may be varied in embodiments herein. For example, other angles between the above mention elements are within the scope of embodiments herein.

The frame may be made of separate elements fixed to one another. Alternatively, one or more of the elements may be integral with one another. The material of the frame may be any that supports the utility of the pet stroller. The frame may be comprised completely or in part by elements that are polymeric or metal. The frame may be comprised completely or in part by elements that are either hollow or solid. Any suitable fasteners may be used to fasten separate frame elements to one another. For example, fastener may be chosen from at least one of rivets, nuts and bolts, screws, junction elements made to fit and secure the various frame elements, etc. This type of material and construction may apply to all other elements of the pet stroller 800. For example, the front pet carrier support 624, the rear pet carrier support 628, the first intermediate cross member 626, and rear cross member 810 may be fashioned in a similar manner. Connectors 634, 636, 638, 640, 642, 644, 646, and 648 are illustrated in FIGS. 6-8. A connector may connect separate pieces of a pet stroller. Alternatively, a connector may be positioned on a single element to provide attachment points for other elements.

The front pet carrier support 624 is illustrated extending between and fixed to the front lower portions 610, 616. Similarly, the rear pet carrier support 628 is illustrated extending between and fixed to the rear lower portions 611, 620.

A pet stroller may simply provide a space for a pet carrier, and optionally supports for a pet stroller. A user then could chose to secure the pet carrier to the pet stroller in any suitable fashion. For example, a pet carrier could be strapped to elements of the pet stroller. The pet stroller embodiment of FIGS. 6-8 comprise first stroller-carrier receiver 674 fixed to the first junction 621a and facing the second junction 621b. The pet stroller of FIGS. 6-8 also comprises a second stroller-carrier receiver 676 fixed to the second junction 621b and facing the first junction 621a. The first stroller-carrier receiver 674 and the second stroller-carrier receiver are capable of engaging pet carrier engagements in order to fix a pet carrier to the pet stroller.

Figure 10:
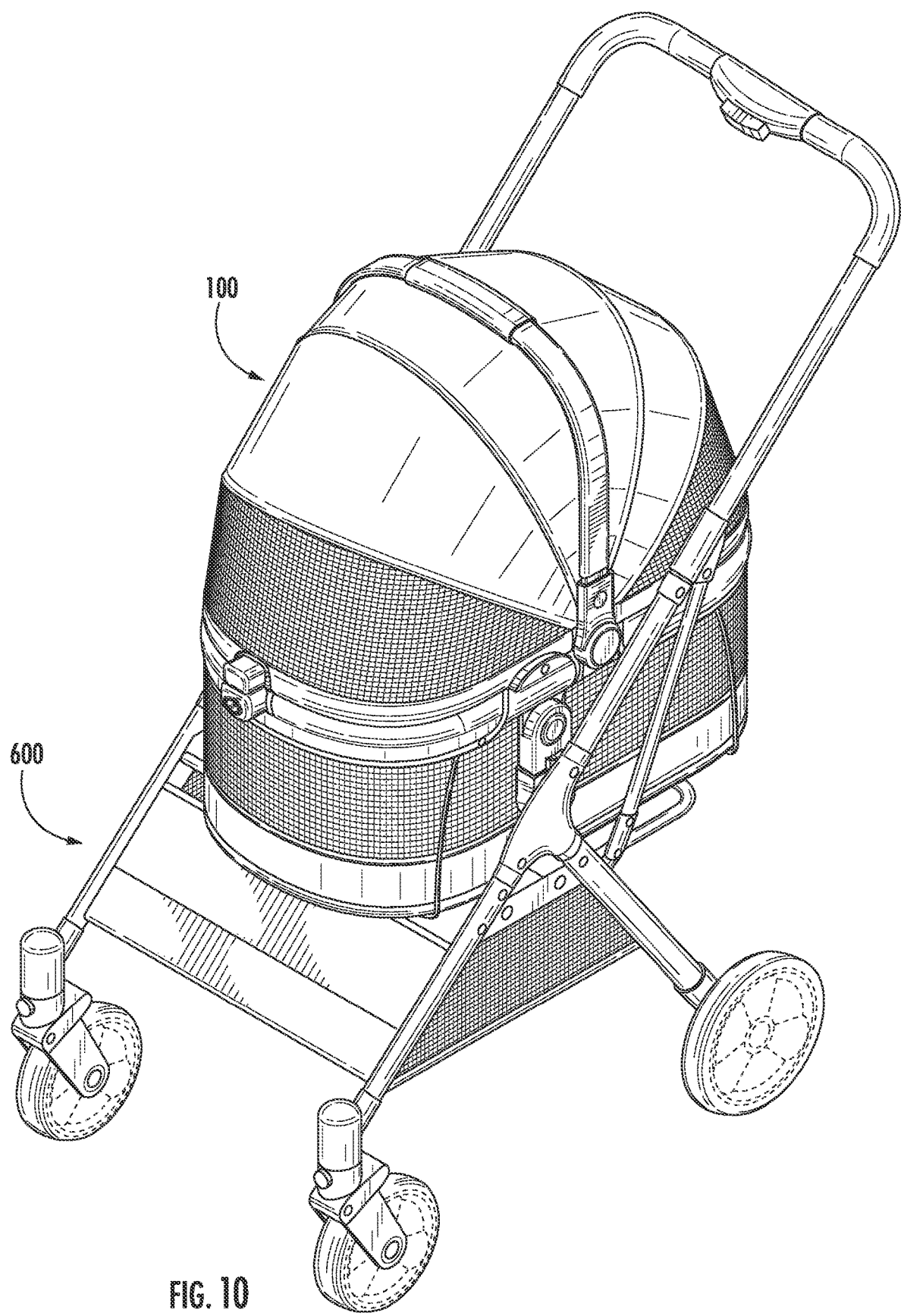
FIG. 10 illustrates an assembly of a pet carrier and a pet stroller.

An embodiment includes an assembly comprising a pet carrier and a pet stroller, where the pet carrier is received in or secured to the pet stroller. The pet carrier may be secured to the pet stroller by any suitable securements. For example, the pet carrier could be lashed to elements of the pet stroller. An embodiment of the assembly comprises the pet carrier 100 secured to the pet stroller 600. See FIG. 10. As illustrated in FIG. 10, the first and second pet carrier engagements 120a, 120b are respectively engaged with the first and second stroller-carrier receivers 674, 676.

An embodiment includes a system comprising a pet carrier, a car seat frame, and a pet stroller. The car seat frame and the pet stroller may be capable of receiving the pet carrier for transport of the pet carrier on either a car seat or the pet stroller. Any suitable method of receiving and/or securing the pet carrier to either the car seat frame or the pet stroller may be part of the system. The pet carrier may comprise one or more engagements that match one or more receivers on one or both of the car seat carrier and the pet stroller. The pet carrier may include one engagement type that matches receiver(s) on the car seat carrier, and a second engagement type that matches receiver(s) on the pet stroller. The engagement(s) of the pet carrier may be of one type, and the receivers on both the car seat carrier and the pet stroller may be configured to match the one type of engagement(s) on the pet carrier. The system may comprise the pet carrier 100, the car seat frame 500, and the pet stroller 600. As illustrated, the first stroller-carrier receiver 674, the second stroller-carrier receiver 676, the first frame-carrier receiver 518, and the second frame-carrier receiver 520 are illustrated as matching such that the pet carrier 100 may be assembled with either the car seat frame 500 or the pet stroller 600.

As stated above, the carrier engagements 120a, 120b may have alternate structures/mechanisms and/or be moved forward or backward along the pet carrier so that the pet carrier can fit to various secondary devices. The carrier engagements herein are non-limiting examples of carrier engagements or carrier engagement means of embodiments herein. Likewise, the carrier receivers and carrier supports on secondary devices may have alternate structures/mechanisms and/or be moved forward or backward along their respective elements to accommodate alternate carrier engagements. The receivers and carrier supports herein are non-limiting examples of receivers or receiver means and carriers or carrier means of embodiments herein. Pet carriers, car seat frames, and strollers may have alternate accessory structures/mechanisms as well. Non-limiting examples include a car seat frame that may have alternate seat belt retainers, a car seat frame that may an alternate configuration of supports positioning the frame-carrier receivers at the correct height, or a stroller with front and back carrier supports contiguous with one another to encircle a carrier.

Figure 11:
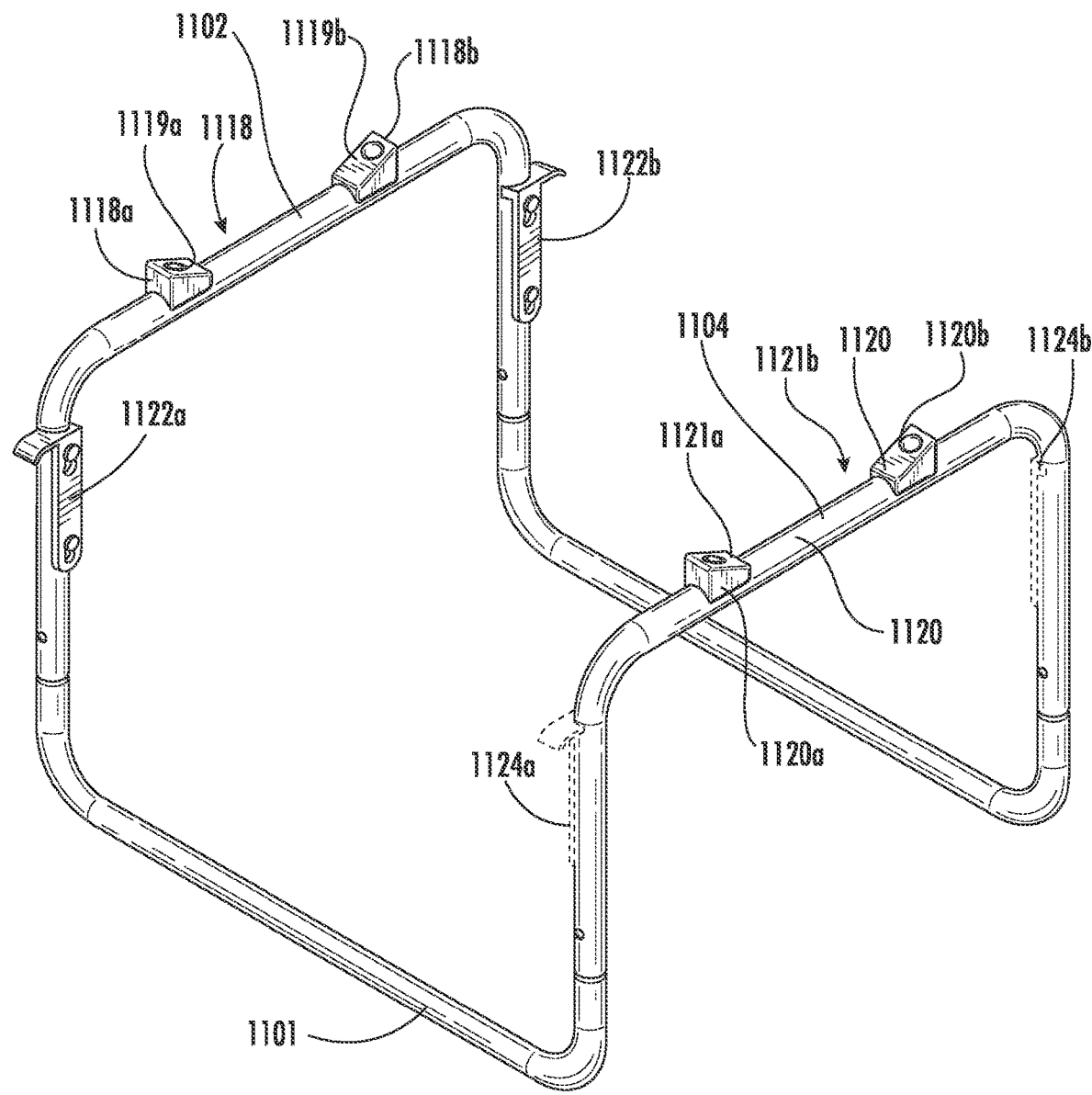
FIG. 11 illustrates a car seat frame exemplifying alternate frame-carrier receivers and alternate seat belt retainers.

Referring to FIG. 11, an embodiment of a car seat frame 1101 exemplifying alternate frame-carrier receivers and alternate seat belt retainers is illustrated. A frame-carrier receiver 1118, on a first side carrier support 1102, is illustrated opposed to a frame-carrier receiver 1120, on a second side carrier support 1104. The frame-carrier receiver comprises a retainer 1118a and a retainer 1118b. In the embodiment illustrated, the retainer 1118a includes an inclined surface 1119a, and the retainer 1118b includes an inclined surface 1119b. The two inclined surfaces 1119a and 1119b are angled toward each other. In this configuration, a pet carrier engagement of a carrier being position upon the car seat frame may be guided into the frame carrier receiver 1118. The retainers may also engage with structures on a pet carrier to aid in position and/or retention of the pet carrier. A frame carrier receiver 1120 is illustrated opposed to the frame-carrier receiver 1118. Like the frame-carrier-receiver 1118, the frame-carrier receiver 1120 includes retainers 1120a and 1120b, with inclined surfaces 1121a and 1121b.

Figure 14:
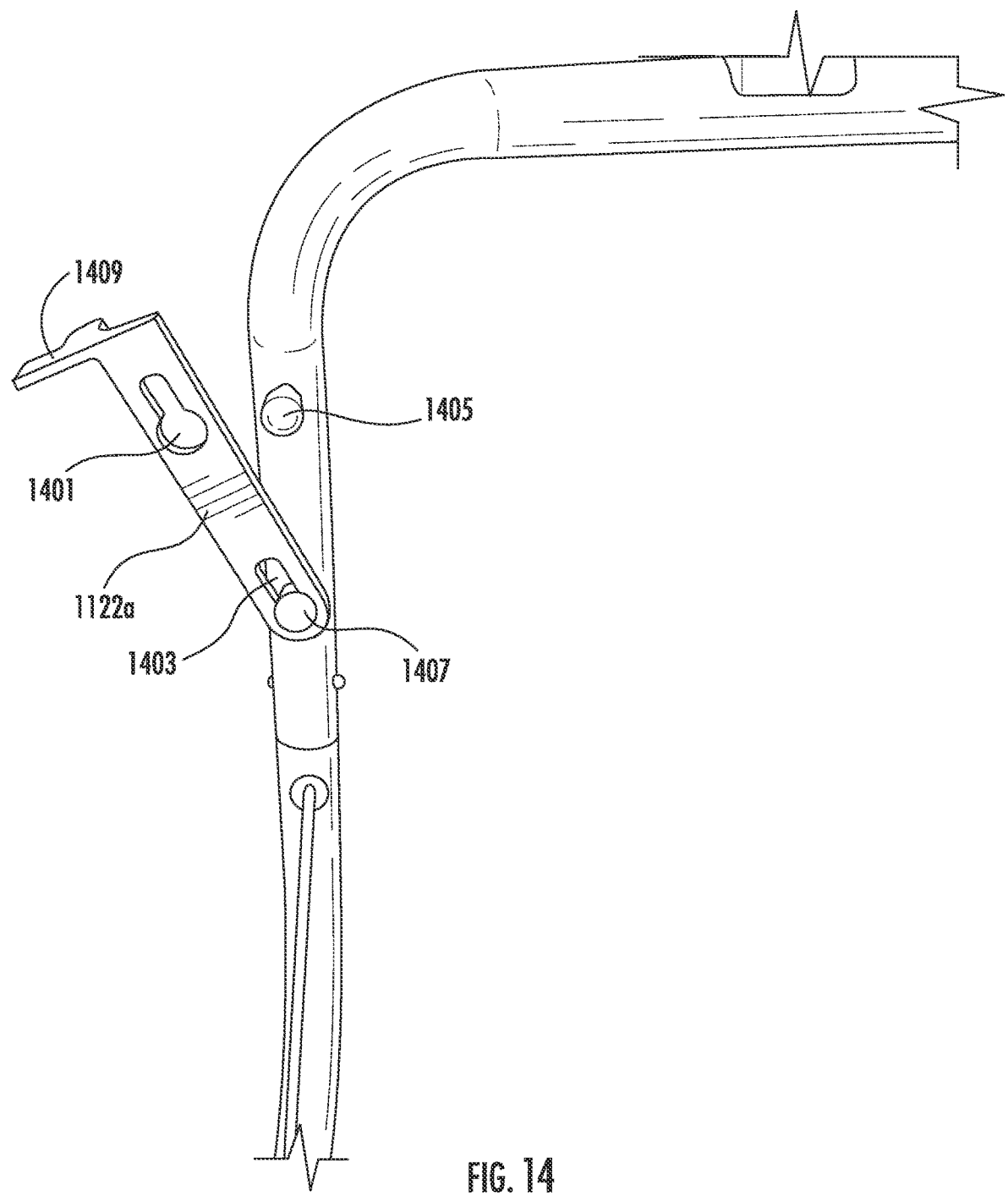
FIG. 14 illustrates one of the seat belt retainers on the car seat frame of FIG. 11.

FIGS. 11 and 14 also illustrate alternate seat belt retainers. One or more of seat belt retainers 1122a, 1122b, 1124a, and 1124b may be included on a car seat frame herein. Referring to seat belt retainer 1122a, the retainer may include a an elongated body comprising a slot 1401 and a slot 1403. The retainer may also include a protrusion 1405 and a protrusion 1407 on a vertical support of the car seat frame. The protrusion 1405 and the protrusion 1407 may be spaced such that a seat belt may be arranged between them. The protrusion 1405 and the protrusion 1407 may also be spaced such that the slot 1401 and the slot 1403 of the elongated body may be respectively fitted thereon. As illustrated, the slots 1401, 1401 may be configured to slide from a widened opening that receives a larger end of the protrusion 1405, 1407, respectively, down to a narrowed opening over a narrowed portion of the protrusion 1405, 1407, thereby locking the elongated body onto the protrusions. A seat belt may be aligned between the protrusion 1405 and 1407 prior to engaging the elongated body, and in such a manner lock the seat belt to the car seat frame. The seat belt retainer 1122a also includes a user control tab 1409, which may be engaged by a user to operate the seat belt retainer 1122a. One seat belt retainer is illustrated in FIG. 14. One or more seat belt retainer of a car seat frame may be similarly configured.

Figure 12:
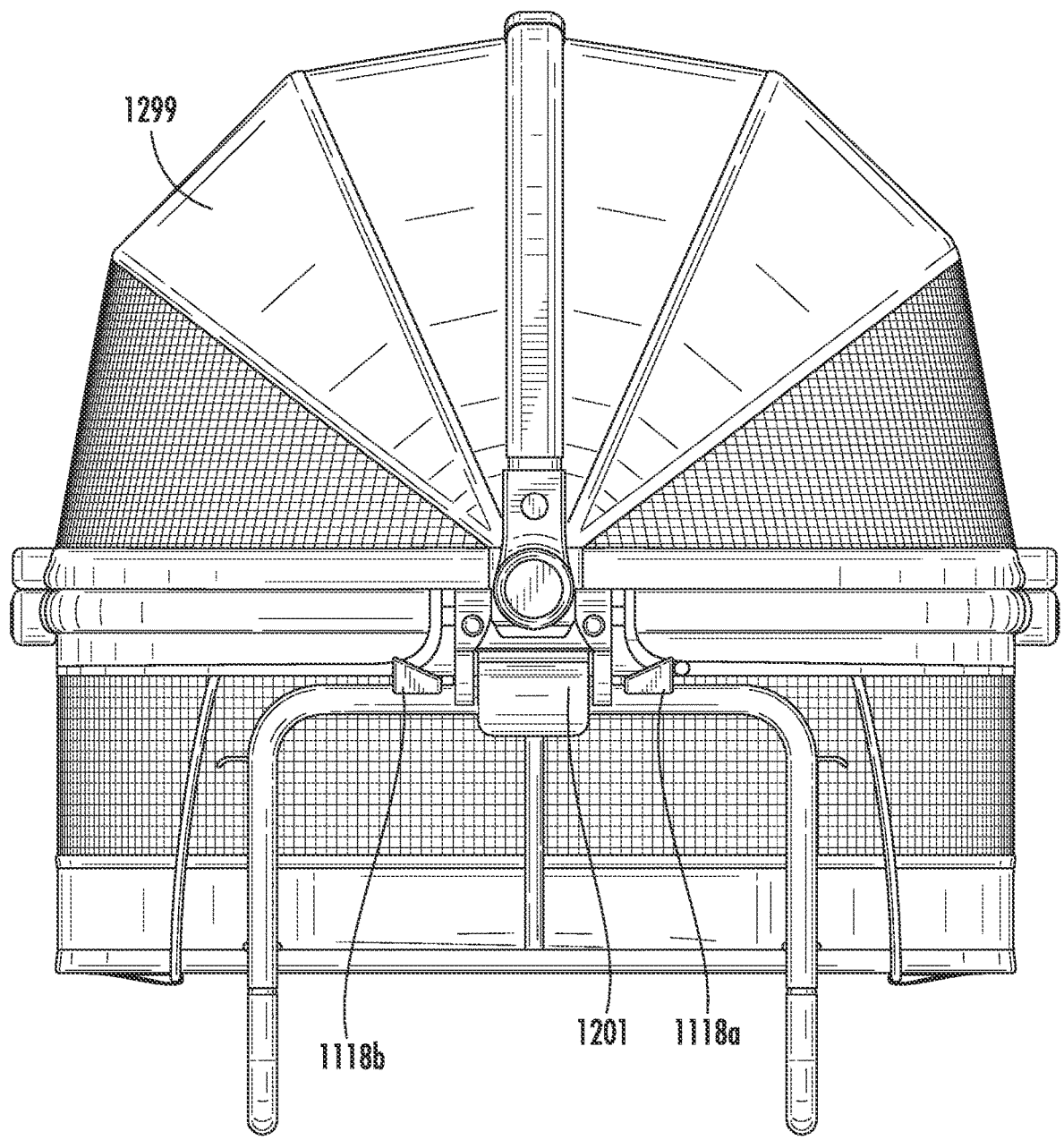
FIG. 12 illustrates a pet carrier with pet carrier engagements in combination with the car seat frame of FIG. 11.

FIG. 12 illustrates a pet carrier 1299 with a pet carrier engagement 1201 in combination with the car seat frame of FIG. 11. As illustrated, the pet carrier engagement 1201 is positioned between the retainers 1118a and 1118b.

Figure 13:
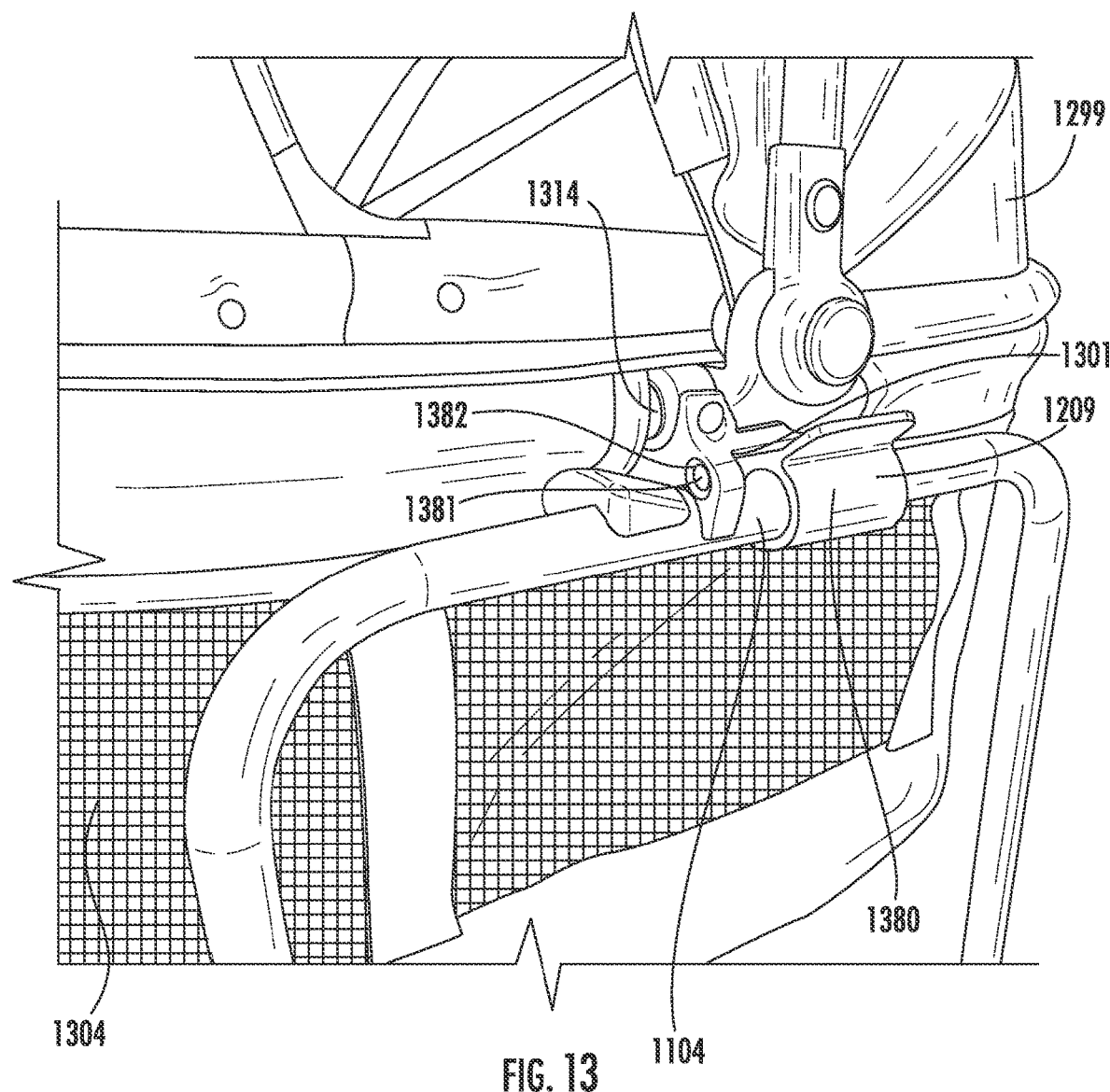
FIG. 13 illustrates one of the pet carrier engagements on the pet carrier illustrated in FIG. 12 engaged with one of the frame-carrier receivers of the car seat frame of FIG. 11.
Figure 16:
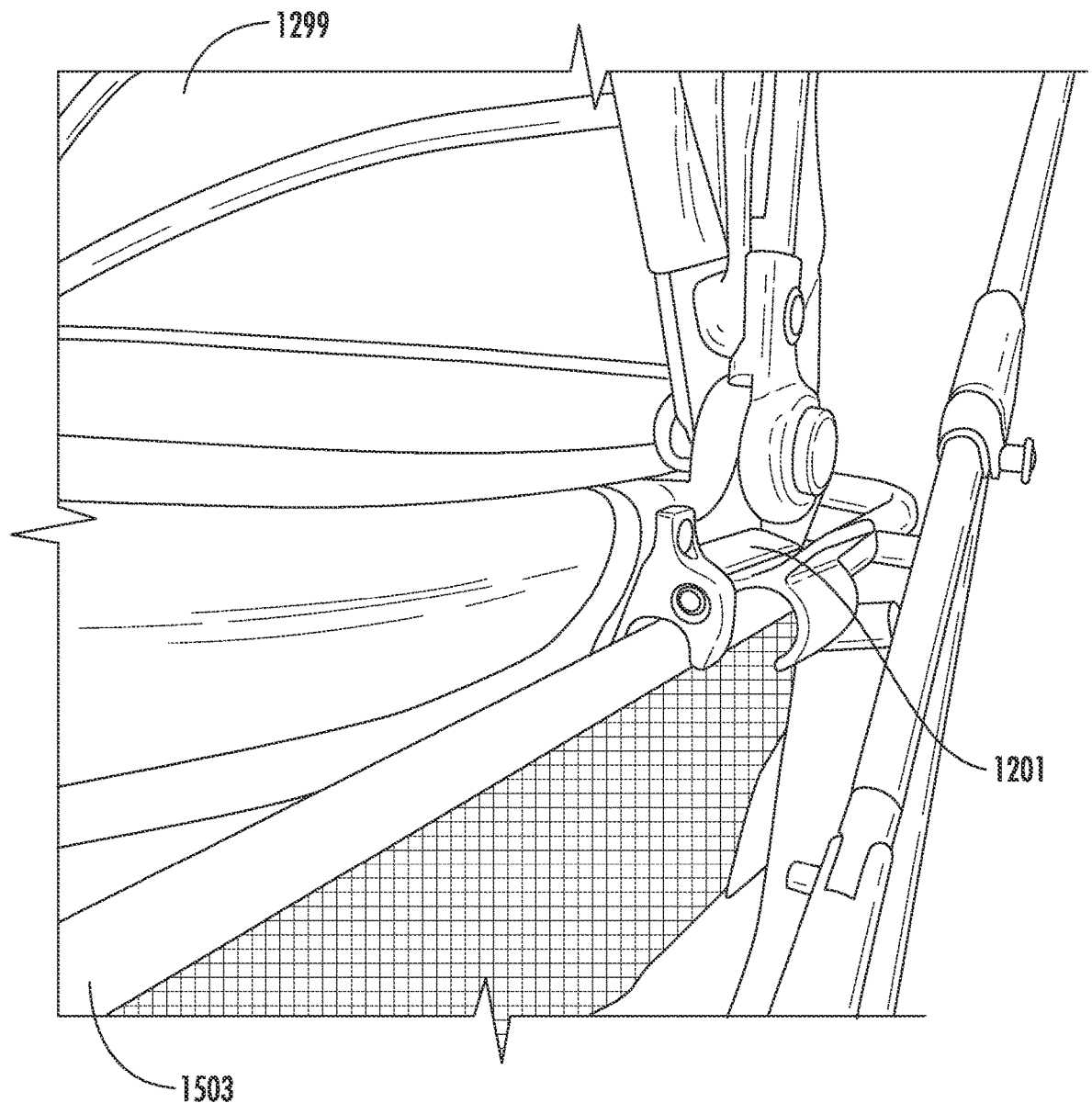
FIG. 16 illustrates the combination of FIG. 15 with one of the pet carrier engagements in an open position but on the stroller.

FIG. 13 illustrates the pet carrier engagement 1201 on the pet carrier illustrated in FIG. 12 engaged with the frame-carrier receiver, like that of frame-carrier receiver 1120 in FIG. 11. The pet carrier engagement 1201 includes a mount 1301, which is fixed to the bottom section 1304 of a pet carrier 1299. A mount may, as illustrated for mount 1301, be fixed to the a first bottom frame element 1314. A pet carrier engagement may also include, as illustrated for pet carrier engagement 1201, a rotating latch 1380. The rotating latch may be connected to a mount. In the embodiment illustrated, the rotating latch 1380 includes pins received in holes within the mount 1301. One pin 1381 is illustrated in one hole 1382. A similar pin and hole to match is on the far side of the rotating latch 1380/mount 1301 combination (not shown). The rotating latch 1380 includes an opening (see FIG. 16) that may be fitted around the second side carrier support 1104. The open position of rotating latch 1380 in FIG. 16 is shown in relation to a stroller. However, a similar configuration may be envisioned between the rotating latch 1380 and the second side carrier support 1104. Once the rotating latch is in position over the support it may be rotated to close upon the support. In FIG. 13, the rotating latch 1380 is illustrated in a position where it has been fitted around the second side carrier support 1104. It may be rotated further downward to a closed position. It may lock in the closed position. The lock may be any suitable lock. The lock may be press fitted engagements that may be released by flexing the rotating latch 1380 or forcing the engagements past one another. A pet carrier may include a pet carrier engagement like pet carrier engagement 1201 on each side, in place of pet carrier engagements 120a and 120b of FIGS. 1 and 2.

FIGS. 15-20 illustrate the pet carrier 1299 having alternate pet carrier engagements and a stroller 1501. The pet carrier engagement 1201 is illustrated on one side of the pet carrier 1299, and a pet carrier engagement 1801 is illustrated on the other side of the pet carrier engagement 1201.

Figure 17:
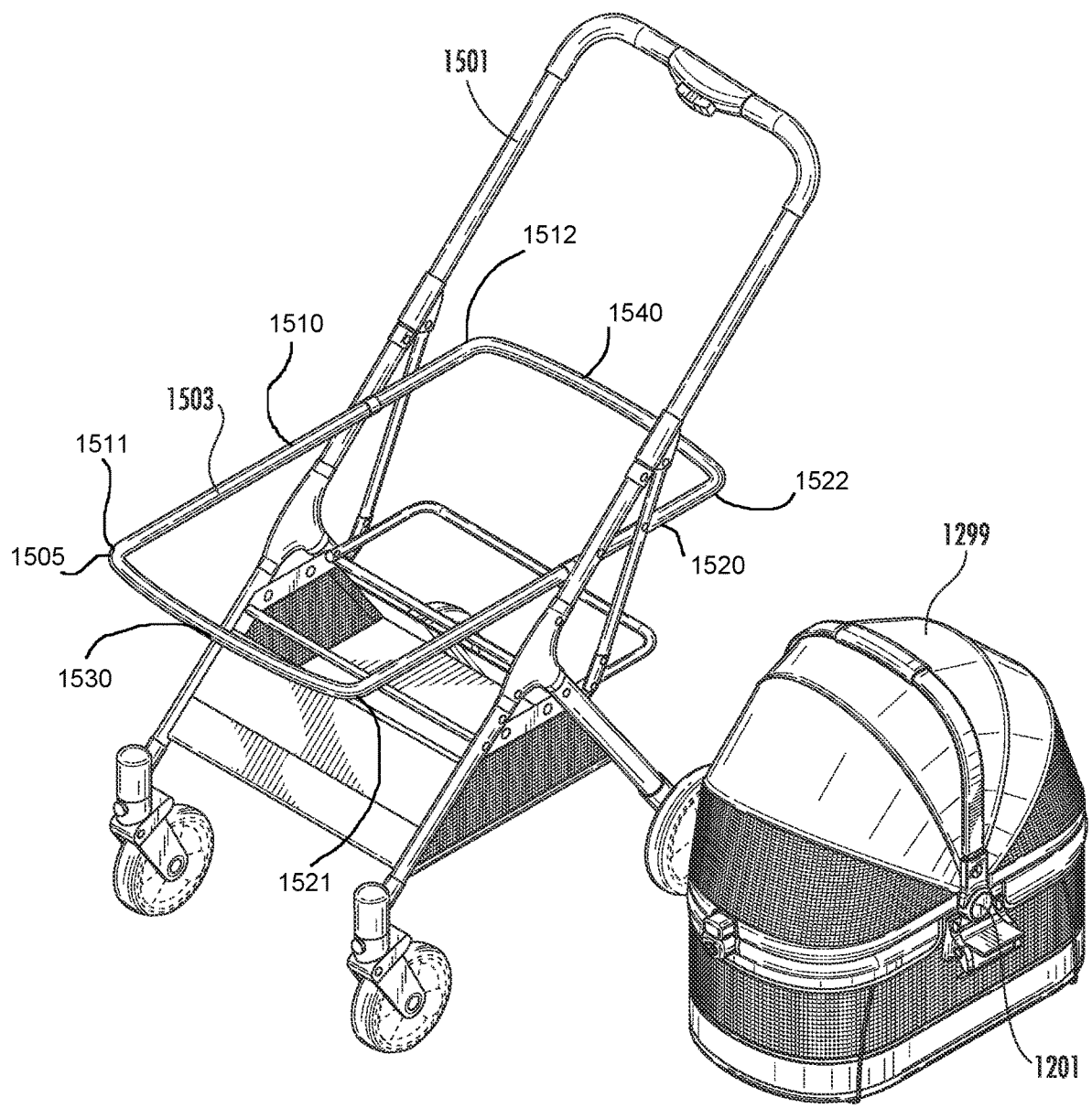
FIG. 17 illustrates a perspective view of the pet carrier and the stroller of FIG. 15 in an un-combined state.
Figure 18:
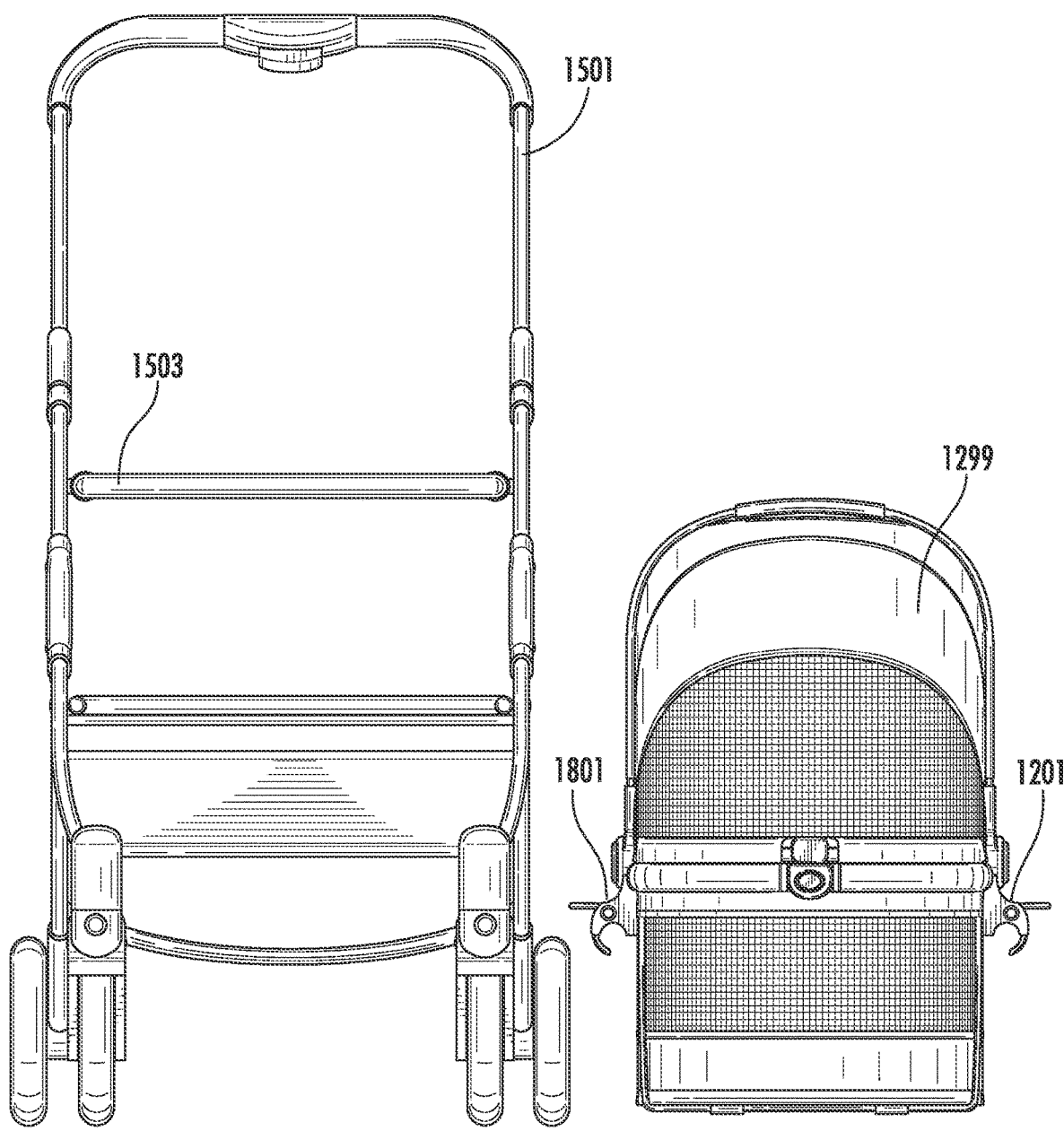
FIG. 18 illustrates a front view of the pet carrier and the stroller of FIG. 15 in an un-combined state.
Figure 19:
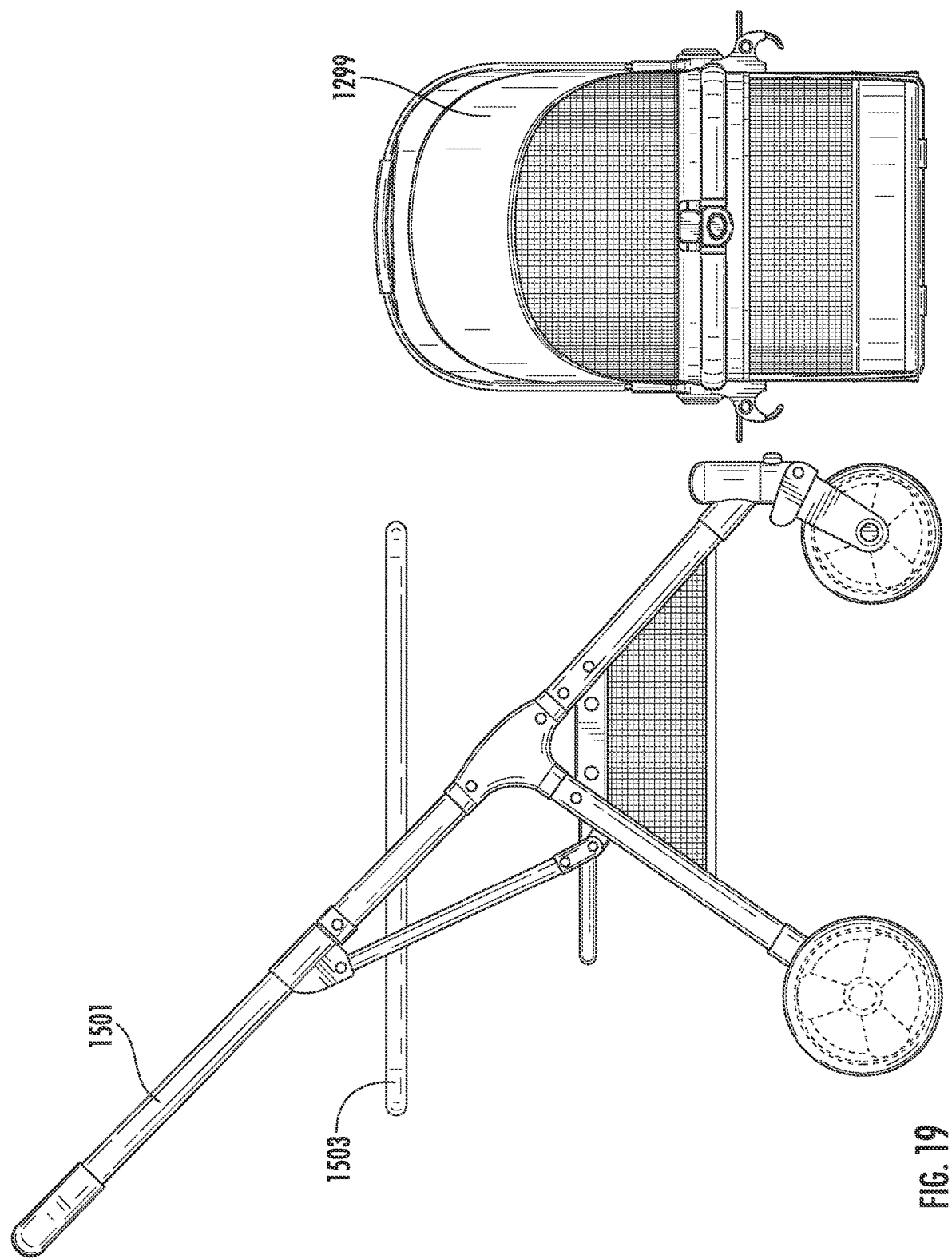
FIG. 19 illustrates a side view of the pet carrier and the stroller of FIG. 15 in an un-combined state.
Figure 20:
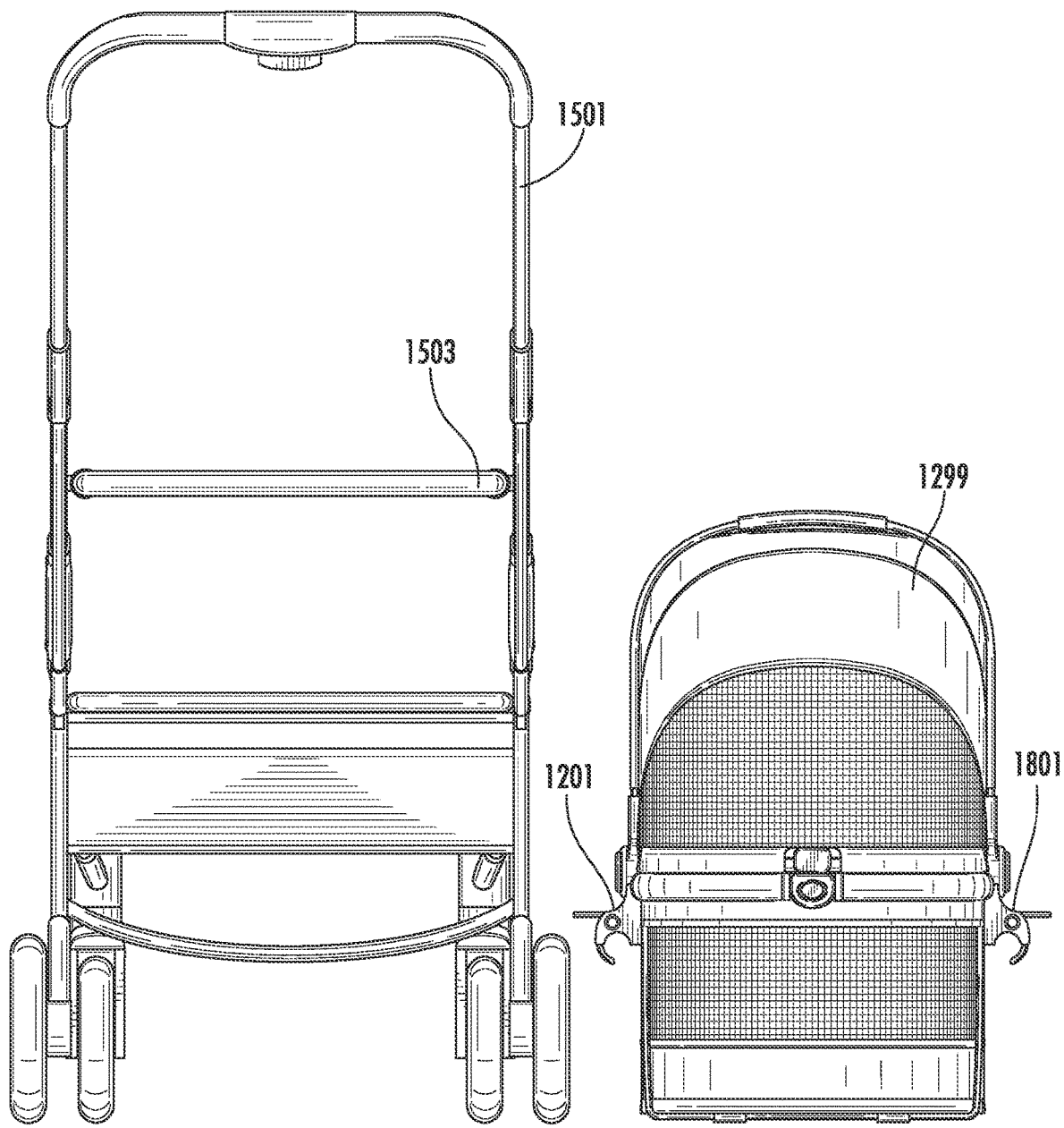
FIG. 20 illustrates a rear view of the pet carrier and the stroller of FIG. 15 in an un-combined state.

Referring to FIG. 17, the stroller 1501 includes a carrier support 1503. The carrier support 1503 may include a carrier support frame 1505 including a first side support 1510 connected to the first side of the stroller and having a front end 1511 and a rear end 1512, and a second side support 1520 connected to the second side of the stroller and having a front end 1521 and rear end 1522. The carrier support may also include a third side 1530 extending from the front end 1511 of the first side support 1510 and the front end 1521 of the second side support 1520, and a fourth side 1540 extending from the rear end 1512 of the first side support 1510 and the rear end 1522 of the second side support 1520. A stroller herein may be configured as known to the skilled artisan to present a wheeled and pushable support system for a pet carrier. The basic elements may be similar to those of the stroller of FIG. 6. Alternatively, a carrier support 1503, as illustrated in FIGS. 15-20, may replace the front carrier support 624 and the rear carrier support 628. The two different carrier support configurations for the strollers of FIG. 6 versus FIGS. 15-20 represent non-limiting means by which a stroller may support a carrier. Generally, a stroller may comprise a carrier support. The carrier support may be two or more different structures. See the non-limiting example of FIG. 6. The carrier support may be a single support (which may comprise a single integral unit, or be comprise of parts engaged together to form the single support). See the non-limiting example of FIGS. 15-20. The support(s) represent non-limiting examples of a support(s) or support means of embodiments herein.

Figure 15:
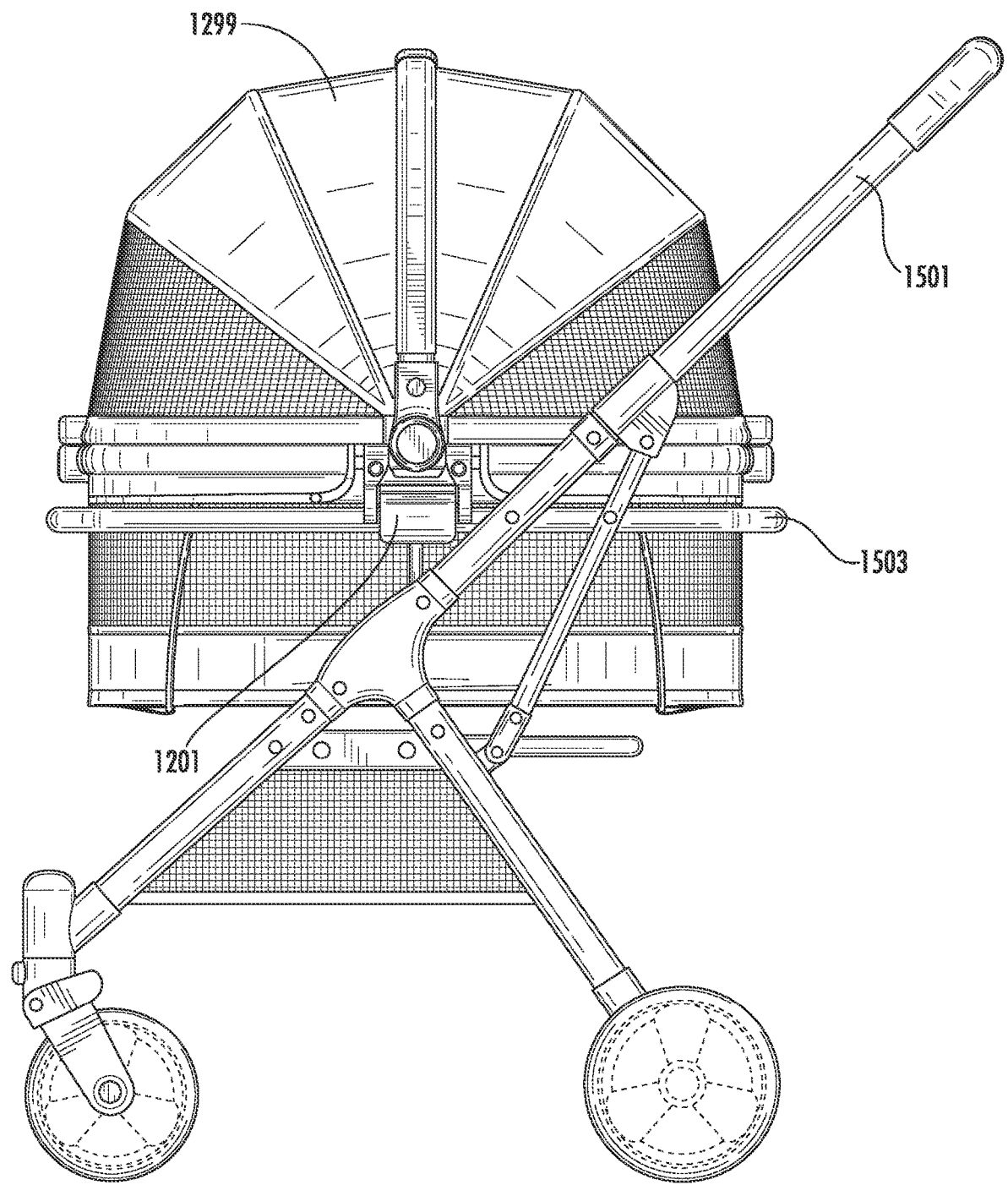
FIG. 15 illustrates a pet carrier having pet carrier engagements in combination with a stroller.

FIG. 15 illustrates the pet carrier 1299 in combination with the stroller 1501. The pet carrier includes the pet carrier engagement 1201, but in FIG. 15 it is engaged on the carrier support 1503 of a stroller 1501. The engagement of the carrier support 1503 by the pet carrier engagement 1201 is similar to that described above for the car set frame in FIGS. 11-13. FIG. 15 illustrates the pet carrier engagement 1201 closed upon the carrier support 1503. FIG. 16 illustrates the pet carrier engagement 1201 fitted onto the carrier support 1503 but in the open position.

FIGS. 17-20 illustrate different views of the stroller 1501 and the pet carrier 1299. The carrier support 1503 may prevent forward or reward movement of the pet carrier 1299. The carrier support may include first and second stroller-carrier receivers. The first and second stroller-carrier receivers may be, but are not necessarily limited to ones similar or the same in configuration and operation as the frame carrier receivers 1118 and 1120, or the stroller-carrier receivers 674, 676.

As stated above, an embodiment includes an assembly comprising a pet carrier and a pet stroller, where the pet carrier is received in or secured to the pet stroller. The pet carrier may be secured to the pet stroller by any suitable securements. For example, the pet carrier could be lashed to elements of the pet stroller. An embodiment of the assembly comprises the pet carrier 1299 secured to the pet stroller 1501.

An embodiment includes an assembly comprising a pet carrier and a car seat frame, where the pet carrier is received in or secured to the car seat frame. The pet carrier may be secured to the car seat frame by any suitable securements. For example, the pet carrier could be lashed to elements of the car seat frame. An embodiment of the assembly comprises the pet carrier 1299 secured to the car seat frame 500. An embodiment of the assembly comprises the pet carrier 100 secured to the car seat frame 1101.

An embodiment includes a system comprising a pet carrier, a car seat frame, and a pet stroller. The car seat frame and the pet stroller may be capable of receiving the pet carrier for transport of the pet carrier on either a car seat or the pet stroller. Any suitable method of receiving and/or securing the pet carrier to either the car seat frame or the pet stroller may be part of the system. The pet carrier may comprise one or more engagements that match one or more receivers on one or both of the car seat carrier and the pet stroller. The pet carrier may include one engagement type that matches receiver(s) on the car seat carrier, and a second engagement type that matches receiver(s) on the pet stroller. The engagement(s) of the pet carrier may be of one type, and the receivers on both the car seat carrier and the pet stroller may be configured to match the one type of engagement(s) on the pet carrier. The system may comprise the pet carrier 100, the car seat frame 500, and the pet stroller 600. As illustrated, the first stroller-carrier receiver 674, the second stroller-carrier receiver 676, the first frame-carrier receiver 518, and the second frame-carrier receiver 520 are illustrated as matching such that the pet carrier 100 may be assembled with either the car seat frame 500 or the pet stroller 600. The system may comprise the pet carrier 1299, the car seat frame 1101, and the pet stroller 1501. As illustrated, the pet carrier engagements 1201 and 1801 can be used to secure the pet carrier 1299 to either the car seat frame 1101 or the pet stroller 1501.

The following list of embodiments is a non-exclusive gathering of embodiments herein. Embodiments otherwise described herein are not excluded from the scope of what may be claimed by this list.

LIST OF EMBODIMENTS

1. A pet carrier comprising a top section, a bottom section having an upper rim, a handle, a first pet carrier engagement, a second pet carrier engagement, and an interior defined between the top section and the bottom section; the top section comprising a front, a back, a canopy, at least one canopy frame element supporting the canopy, a front canopy latch element at the front, and a back canopy latch element at the back, the canopy comprising a lower edge configured to be proximal to the upper rim of the bottom section, a first canopy frame element of the at least one canopy frame element extending at least partially around the lower edge of the canopy and having a front section at the front and a back section at the back, the front section and the back section meeting at a first pivot on a first side of the canopy and meeting at a second pivot on a second side of the canopy, the front canopy latch element fixed to the front section and the back canopy latch element fixed to the back section; the bottom section comprising a base, a front, a back, a first side, a second side, a shell, a bottom frame element, a front bottom latch element on the front, and a back bottom latch element on the back, the shell extends up from the base to the bottom frame element, the bottom frame element extends around the upper rim of the bottom, and the front and the back bottom latch elements are fixed to the bottom frame element; the handle comprising a first handle receiver engaged with one or more of the first canopy frame element and the first bottom frame element on a first side of the pet carrier, and a second handle receiver engaged with one or more of the first canopy frame element and the first bottom frame element on a second side of the pet carrier, a handle bar extending from the first handle receiver to the second handle receiver and over the canopy; the front canopy latch element being engageable with the front bottom latch element to secure the front of the top to the front of the bottom in a front closed position, and being releasable to an open position, allowing movement of the top section at the front of the pet carrier to reveal the interior of the pet carrier; the back canopy latch element being engageable with the back bottom latch element to secure the back of the top to the back of the bottom in a back closed position, and being releasable to an open position, allowing movement of the top section at the back of the pet carrier to reveal the interior of the pet carrier; the first pet carrier engagement on the first side of the bottom section, the second pet carrier engagement on the second side of the bottom section, both the first pet carrier engagement and the second pet carrier engagement being engageable with a secondary device in order to fix the pet carrier to the secondary device; and the top section, the bottom section, and the base forming an enclosure, in which a pet may be contained, within the interior of the pet carrier when the front and the back of the canopy are in the closed position.

2. The pet carrier of embodiment 1 further comprising a first support wire proximal to the front of the bottom section, engaged with the first bottom frame element on first and second sides of the bottom section, and extending from the first bottom frame element along the first side of the bottom toward the base, across the base, and along the second side of the bottom toward the first bottom frame element, and a second support wire proximal to a rear of the bottom section, engaged with the first bottom frame element on the first and second sides of the bottom, and extending from the first bottom frame element along the first side of the bottom toward the base, across the base, and along the second side of the bottom toward the first bottom frame element, one or both of the first support wire and second support wire may be positioned either exterior to the bottom or interior to the bottom.

3. The pet carrier of embodiment 1 or embodiment 2, wherein the first pet carrier engagement extends toward the base, and the second pet carrier engagement extends toward the base.

4. The pet carrier of embodiment 1 or embodiment 2, wherein the first pet carrier engagement comprises a first mount fixed to the bottom section, and a first rotating latch rotatably fixed to the first mount and configured to engage the secondary device, and the second pet carrier engagement comprises a second mount fixed to the bottom section, and a second rotating latch rotatably fixed to the second mount and configured to engage the secondary device.

5. A car seat frame comprising a first side, a second side, a first base element having a first end and a second end, and a second base element having a first end and a second end; the first side comprising a first side carrier support, a first vertical support on the first side, and a second vertical support on the first side, each vertical support on the first side having a first end and a second end, the first end of each fixed to opposite ends of the first side carrier support; the second side comprising a second side carrier support, a first vertical support on the second side, and a second vertical support on the second side, each vertical support on the second side having a first end and a second end, the first end of each fixed to opposite ends of the second side carrier support; and the second end of the first vertical support on the first side is fixed to the first end of the first base element, the second end of the second vertical support on the first side is fixed to the first end of the second base element, the second end of the first vertical support on the second side is fixed to the second end of the first base element, and the second end of the second vertical support on the second side is fixed to the second end of the second based element; the car seat frame further comprising a first frame-carrier receiver fixed to the first side carrier support and a second car seat frame-carrier receiver fixed to the second side carrier support.

6. The car seat frame of embodiment 5, wherein the first frame-carrier receiver comprises a first retainer and a second retainer fixed on the first side carrier support, and a first side carrier support length of the first carrier support positioned between the first retainer and the second retainer, the first retainer and the second retainer spaced to receive a first pet carrier engagement therebetween, the second frame-carrier receiver comprises a third retainer and a fourth retainer fixed on the second side carrier support, and a second side carrier support length of the second side carrier support positioned between the third retainer and the fourth retainer, the third retainer and the fourth retainer spaced to receive a second pet carrier engagement therebetween.

7. The car seat frame embodiment 5 or embodiment 6 comprising one or more a seat belt retainers, where each seat belt retainer is fixed to one of the vertical supports.

8. The car seat frame of embodiment 7, wherein the one or more seat belt retainers comprise a first seat belt retainer fixed to the first vertical support on the first side and a second seat belt retainer fixed to the second vertical support on the first side.

9. An assembly comprising a pet carrier and the car seat frame of any one of embodiments 5-8.

10. The assembly of embodiment 9, wherein the pet carrier is the pet carrier of one of embodiments 1-4.

11. The assembly of embodiment 10, wherein the first pet carrier engagement is engaged with the first frame-carrier receiver, and the second pet carrier engagement is engaged with the second frame-carrier receiver.

12. A pet stroller comprising a frame and four wheels; the frame comprising a first side, a second side, a push bar, a carrier support, each side comprising a front lower portion, a rear lower portion, a mid portion, and an upper portion; each of the front and rear lower portions having first end and a wheel engagement at the first end to which one of the wheels is engaged; the front and rear lower portions on the first side each having a second end opposite the respective first ends that converge at a first junction, the front and rear lower portions on the second side each having a second end opposite the respective first end that converges at a second junction; the mid portion on the first side having a first end at the first junction and a second end extended in a direction generally opposite to the direction in which the lower portion on the first side extends from the first junction, the mid portion on the second side having a first end at the second junction and a second end extending in a direction generally opposite to the direction in which the lower portion on the second side extends from the second junction; the upper portion on the first side having a first end extending from the second end of the mid portion on the first side and a second end, the upper portion on the second side having a first end extending from the second end of the mid portion on the second side and a second end; the push bar having a first end connected to the second end of the upper portion on the first side, and a second end connected to the second end of the upper portion on the second side; wherein the carrier support is configured to receive a pet carrier.

13. The pet stroller of embodiment 12, wherein the carrier support comprises a frame defining a rectangular opening into which a pet carrier may be received, a first side of the frame connected to the first side of the stroller and a second side of the frame connected to the second side of the stroller, and wherein the pet carrier engagements of a pet carrier may be received by the carrier support.

14. The pet stroller of embodiment 13, wherein the first side of the frame is connected to the mid portion on the first side of the stroller and a second side of the frame is connected to the mid portion on the second side of the stroller.

15. The pet stroller of embodiment 12, wherein the pet stroller further comprises a first stroller-carrier receiver fixed to the first junction and facing the second junction, and a second stroller-carrier receiver fixed to the second junction and facing the first junction, the first and second stroller-carrier receivers capable of engaging carrier engagements in order to fix a pet carrier to the pet stroller.

16. The pet stroller of embodiment 12 or embodiment 15, wherein the carrier support comprises a front pet carrier support extending between and fixed to the front lower portions, and a rear pet carrier support extending between and fixed to the rear lower portions.

17. An assembly comprising a pet carrier and the pet stroller of one of embodiments 12-16, wherein the pet carrier engagements engage the pet stroller.

18. The assembly of embodiment 17, wherein the pet carrier is the pet carrier of one of embodiments 1-4.

19. The assembly of embodiment 18, wherein the first and second pet carrier engagements are respectively engaged with either the carrier support or the first and second stroller-carrier receivers.

20. A system comprising at least two of the pet carrier of one of embodiments 1-4, the car seat frame of one or more of embodiments 5-8, the assembly of one or more of embodiments 9-11, the pet stroller of one of embodiments 12-16, and the assembly of one of embodiments 17-19.

Further embodiments may be achieved by changing a structure in an embodiment herein to a corresponding structure in another embodiments herein. For example, the pet carrier engagements of FIGS. 1-3 may be used in systems herein in combination with car seats or strollers with receivers like FIGS. 4-10 but fitted onto a support like that of support 1503 of FIGS. 15-20.

REFERENCE CHARACTER LISTING

100—Pet Carrier
102—Top Section
104—Bottom Section
105—Shell
106—Handle
107a—First Handle Receiver
107b—Second Handle Receiver
107c—First Handle Release
107d—Second Handle Release
108—Canopy
109—Lower Edge
110a—Front Canopy Latch Element
110b—Rear Canopy Latch Element
111—First Canopy Frame Element
111a—Ridge
111b—Ridge
111c—Ridge
111d—Ridge
112—Carrier Grip
114—First Bottom Frame Element
115a—Front Bottom Latch Element
115b—Back Bottom Latch Element
116—First Support Wire
118—Second Support Wire
120a—Pet Carrier Engagement
120b—Pet Carrier Engagement
124—Base
125—Upper Rim
126—Front Section of First Canopy Frame Element
127—Rear Section of First Canopy Frame Element
128—First Pivot
129—Second Pivot
130—Handle Bar
131—Grip
210a—Wire Holder
210b—Wire Holder
310a—Wire Holder
310b—Wire Holder
500—Car Seat Frame
502—First Side Carrier Support
504—Second Side Carrier Support
506—First Vertical Support on the First Side
508—Second Vertical Support on the First Side
510—First Vertical Support on the Second Side
512—Second Vertical Support on the Second Side
514—First Base Element
516—Second Base Element
518—Frame-Carrier Receiver
520—Frame-Carrier Receiver
522a—Seat Belt Retainer
522b—Seat Belt Retainer
524a—Seat Belt Retainer
524b—Seat Belt Retainer
600—Pet stroller
601—Frame
602—First Side
604—Second Side
610—Front First Side Lower Portion
611—Rear First Side Lower Portion
612—Upper Portion
613—Upper Portion
614—Mid Portion
615—Mid Portion
616—Front Second Side Lower Portion
620—Rear Second Side Lower Portion
621a—First Junction
621b—Second Junction
622—Brace
624—Front Pet Carrier Support
625—Brace
626—First Intermediate Cross Member
628—Rear Pet Carrier Support
630—Grip
631—Push Bar
632—Release
634—Connector
636—Connector
638—Connector
640—Connector
642—Connector
644—Connector
646—Connector
648—Connector
650—Front Panel
652—First Side Panel
654—Second Side Panel
656—Bottom Panel
658—Wheel
660—Wheel
662—Wheel
664—Wheel
666—Wheel Housing
668—Wheel Housing
670—Front Wheel Bearing Support
672—Front Wheel Bearing Support
674—First Stroller-Carrier Receiver
676—Second Stroller-Carrier Receiver
810—Rear Cross Member
1101—Car Seat Frame
1102—First Side Carrier Support
1104—Second Side Carrier Support
1118—Frame-Carrier Receiver
1118a—Retainer
1118b—Retainer
1119a—Inclined Surface
1119b—Inclined Surface
1120—Frame-Carrier Receiver 1120a—Retainer
1120b—Retainer
1121a—Inclined Surface
1121b—Inclined Surface
1201—Pet Carrier Engagement 1201
1299—Pet Carrier
1301—Mount
1304—Bottom Section
1314—First Bottom Frame Element
1380—Rotating Latch
1501—Stroller
1503—Carrier Support
1801—Pet Carrier Engagement It is understood, therefore, that the invention is not limited to the particular embodiments disclosed, but is intended to cover all modifications which are within the spirit and scope of the invention as defined by the appended claims, the above description, and/or shown in the attached drawings.

The invention claimed is:

1. An assembly comprising a pet stroller with a removably attached pet carrier:

the pet stroller comprising:
a stroller frame comprising a first side, a second side, a push bar, a carrier support, each side comprising a front lower portion, a rear lower portion, a mid portion, and an upper portion;
each of the front and rear lower portions having a first end and a wheel engagement at the first end to which a wheel is engaged;
the front and rear lower portions on the first side each having a second end opposite the respective first ends that converge toward one another, the front and rear lower portions on the second side each having a second end opposite the respective first end that converge toward one another; and the pet carrier comprising:
a top section, a bottom section having an upper rim, a first pet carrier engagement, a second pet carrier engagement, and an interior defined between the top section and the bottom section;
the top section comprising a front, a back, a canopy, at least one canopy frame element supporting the canopy, the canopy comprising a lower edge configured to be proximal to the upper rim of the bottom section, a first canopy frame element of the at least one canopy frame element extending at least partially around the lower edge of the canopy and having a front section at the front and a pivotal connection to the upper rim;
the bottom section comprising a base, a front, a back, a first side, a second side, a shell, and a bottom frame element, the shell extends up from the base to the bottom frame element, the bottom frame element extends around and defines the upper rim of the bottom;
at least one of the top section at the front of the pet carrier or the top section at the back of the pet carrier is openable to reveal the interior of the pet carrier;
the first pet carrier engagement at the first side of the bottom section, the second pet carrier engagement at the second side of the bottom section, both the first pet carrier engagement and the second pet carrier engagement being engageable with the carrier support of the stroller; and
the top section, the bottom section, and the base forming an enclosure, in which a pet may be contained within the interior of the pet carrier when the front and the back of the canopy are in a closed position;
wherein the first pet carrier engagement comprises a first mount fixed to the bottom section, the first mount including hooked protrusions extending at either end of the first mount and a first rotating latch rotatably coupled to the first mount between the hooked protrusions, the hooked protrusions of the first mount and the first rotating latch are configured to engage a first side support of the carrier support of the stroller.

2. The assembly of claim 1, wherein the second pet carrier engagement comprises a second mount fixed to the bottom section, the second mount including hooked protrusions extending at either end of the second mount and a second rotating latch rotatably coupled to the second mount between the hooked protrusions, the hooked protrusions of the second mount and the second rotating latch are configured to engage a second side support of the carrier support of the stroller.

3. An assembly comprising a pet stroller with a removably attached pet carrier:

the pet stroller comprising:
a stroller frame comprising a first side, a second side, a push bar, a carrier support, each side comprising a front lower portion, a rear lower portion, a mid portion, and an upper portion;
each of the front and rear lower portions having a first end and a wheel engagement at the first end to which a wheel is engaged;
the front and rear lower portions on the first side each having a second end opposite the respective first ends that converge toward one another, the front and rear lower portions on the second side each having a second end opposite the respective first end that converge toward one another;
each mid portion being a singular bar having a first end connected to the second end of the respective front lower portion and a second end that extends in an opposite direction;
the upper portion on the first side having a first end extending from the second end of the mid portion on the first side and a second end, the upper portion on the second side having a first end extending from the second end of the mid portion on the second side and a second end;
the push bar having a first end connected to the second end of the upper portion on the first side, and a second end connected to the second end of the upper portion on the second side; and
a first brace extending from the rear lower portion on the first side to the upper portion on the first side and a second brace extending from the rear lower portion on the second side to the upper portion on the second side wherein
the carrier support is located in a region of the mid portions and comprises a carrier support frame including a first side support connected only directly to the first side mid portion and the first brace and having a front end and a rear end, and a second side support connected only directly to the second side mid portion and the second brace and having a front end and rear end, a third side extending from the front end of the first side support to the front end of the second side support, and a fourth side extending from the rear end of the first side support to the rear end of the second side support, the carrier support configured to receive the pet carrier within the carrier support frame; and the pet carrier comprising:

a top section, a bottom section having an upper rim, a first pet carrier engagement, a second pet carrier engagement, and an interior defined between the top section and the bottom section;

the top section comprising a front, a back, a canopy, at least one canopy frame element supporting the canopy, the canopy comprising a lower edge configured to be proximal to the upper rim of the bottom section, a first canopy frame element of the at least one canopy frame element extending at least partially around the lower edge of the canopy and having a front section at the front and a pivotal connection to the upper rim;

the bottom section comprising a base, a front, a back, a first side, a second side, a shell, and a bottom frame element, the shell extends up from the base to the bottom frame element, the bottom frame element extends around and defines the upper rim of the bottom;

at least one of the top section at the front of the pet carrier or the top section at the back of the pet carrier is openable to reveal the interior of the pet carrier;

the first pet carrier engagement at the first side of the bottom section, the second pet carrier engagement at the second side of the bottom section, both the first pet carrier engagement and the second pet carrier engagement being engageable with the carrier support of the stroller; and the top section, the bottom section, and the base forming an enclosure, in which a pet may be contained within the interior of the pet carrier when the front and the back of the canopy are in the closed position;

wherein the bottom section further comprises a front canopy latch on the front, the front canopy latch protruding outwardly from the bottom frame element, and the front canopy latch having a shape of a rectangular cuboid;

wherein the first pet carrier engagement comprises a first mount fixed to the bottom section, the first mount including hooked protrusions extending at either end of the first mount and a first rotating latch rotatably coupled to the first mount between the hooked protrusions, the hooked protrusions of the first mount and the first rotating latch are configured to engage the first side support of the carrier support of the stroller.

4. The assembly of claim 3, wherein the front canopy latch is engageable to secure the front of the top to the front of the bottom in a front closed position, and being releasable to an open position, allowing movement of the top section at the front of the pet carrier to reveal the interior of the pet carrier.

5. The assembly of claim 4, wherein the back of the top is connectable to the back of the bottom in a back closed position, and is releasable to an open position, allowing movement of the top section at the back of the pet carrier to reveal the interior of the pet carrier.

6. The assembly of claim 3, wherein the first and second pet carrier engagements are engaged with the carrier support.

7. The assembly of claim 6 further comprising a lower carrier support on the pet stroller, the lower carrier support comprising a front frame connected to the front lower portions, and a rear frame connected to the rear lower portions.

8. The assembly of claim 3 further comprising a handle connected to the pet carrier.

9. The assembly of claim 7, wherein the lower carrier support supports the bottom frame element of the pet carrier.

10. The assembly of claim 7 further comprising a storage area located beneath the lower carrier support, the storage area including a flexible bottom and two side panels, one located on each of the first and second sides of the stroller frame.

11. The assembly of claim 3, wherein the carrier support frame includes a continuous perimeter.

12. The assembly of claim 3, wherein the carrier support frame is oriented in a singular flat plane.

13. The assembly of claim 3, wherein the second pet carrier engagement comprises a second mount fixed to the bottom section, the second mount including hooked protrusions extending at either end of the second mount and a second rotating latch rotatably coupled to the second mount between the hooked protrusions, the hooked protrusions of the second mount and the second rotating latch are configured to engage the second side support of the carrier support of the stroller.

14. The assembly of claim 3, wherein the rectangular cuboid shape of the front canopy latch includes rounded corners.

15. The assembly of claim 3, wherein the top section further comprises a top front canopy latch on the front, the top front canopy latch protruding outwardly from the first canopy frame element, and the top front canopy latch having a shape of a rectangular cuboid.

* * * * *